United States Patent
Choi et al.

(10) Patent No.: US 11,390,296 B2
(45) Date of Patent: Jul. 19, 2022

(54) VEHICLE CONTROL APPARATUS PROVIDED IN VEHICLE AND CONTROL METHOD OF VEHICLE

(71) Applicant: LG ELECTRONICS INC., Seoul (KR)

(72) Inventors: Heedong Choi, Seoul (KR); Duckgee Park, Seoul (KR)

(73) Assignee: LG Electronics Inc., Seoul (KR)

( * ) Notice: Subject to any disclaimer, the term of this patent is extended or adjusted under 35 U.S.C. 154(b) by 127 days.

(21) Appl. No.: 16/874,132

(22) Filed: May 14, 2020

(65) Prior Publication Data

US 2020/0269866 A1 Aug. 27, 2020

Related U.S. Application Data

(63) Continuation of application No. PCT/KR2017/013346, filed on Nov. 22, 2017.

(30) Foreign Application Priority Data

Nov. 15, 2017 (KR) .................. 10-2017-0152407

(51) Int. Cl.
*B60W 50/14* (2020.01)
*B60W 60/00* (2020.01)
*H04L 43/0817* (2022.01)

(52) U.S. Cl.
CPC ........ *B60W 50/14* (2013.01); *B60W 60/0054* (2020.02); *H04L 43/0817* (2013.01); *B60W 2050/146* (2013.01)

(58) Field of Classification Search
CPC ............ B60W 40/08; B60W 50/0098; B60W 2540/043; B60W 40/09; B60W 2050/146; B60W 2555/60; B60W 2040/0872; B60W 2040/0881; B60W 2540/22; B60W 50/08; B60W 2050/0064; B60W 2050/0095; B60W 2540/221; B60W 2540/26;
(Continued)

(56) References Cited

U.S. PATENT DOCUMENTS

2009/0231432 A1* 9/2009 Grigsy .................. G08G 1/161
348/149
2013/0041580 A1 2/2013 Petrucci et al.
(Continued)

FOREIGN PATENT DOCUMENTS

JP 2004247907 9/2004
JP 2017022503 1/2017
(Continued)

OTHER PUBLICATIONS

Inokuchi, Tracking travel control unit, Aug. 25, 2014, Machine English translation of JP 2014-151675 A (Year: 2014).*
(Continued)

*Primary Examiner* — James J Lee
*Assistant Examiner* — Matthew L Parulski
(74) *Attorney, Agent, or Firm* — Fish & Richardson P.C.

(57) ABSTRACT

A vehicle control apparatus includes a communication unit, a display, and a processor. The communication unit can establish communication with an external apparatus. The processor can control the display to activate a graphic object of a content on the basis of communication reliability between the external apparatus and the communication unit.

19 Claims, 16 Drawing Sheets

(58) Field of Classification Search
CPC ............... B60W 30/182; B60W 40/04; B60W 2710/30; B60W 2556/45; B60W 50/085; B60W 50/14; B60W 10/08; B60W 10/30; B60W 10/06; B60W 2556/50; B60W 2710/08; B60W 2720/00; B60W 30/06; B60W 10/20; B60W 2400/00; B60W 2556/65; B60W 10/10; B60W 10/18; B60W 10/184; B60W 2300/128; B60W 2300/16; B60W 2510/20; B60W 2540/18; B60W 2710/18; B60W 2710/20; B60W 30/143; B60W 30/18172; B60W 40/02; B60W 50/00; B60W 50/0205; B60W 50/023; B60W 50/029; B60W 2510/244; B60W 2520/10; B60W 30/188; B60W 10/11; B60W 20/30; B60W 2040/0809; B60W 2050/0024; B60W 2050/007; B60W 2050/0083; B60W 2420/403; B60W 2520/04; B60W 2530/18; B60W 2540/00; B60W 2540/12; B60W 2540/215; B60W 2540/30; B60W 2710/0666; B60W 2710/0677; B60W 2710/10; B60W 30/08; B60W 30/146; B60W 30/165; B60W 30/1819; B60W 50/0097; B60W 50/10; B60W 60/00253; B60W 60/0054; B60W 10/26; B60W 20/20; B60W 20/40; B60W 2040/0827; B60W 2040/0836; B60W 2050/143; B60W 2420/42; B60W 2552/00; B60W 2552/20; B60W 2552/30; B60W 2555/20; B60W 2556/10; B60W 2720/10; B60W 2720/103; B60W 2720/106; B60W 2720/24; B60W 30/095; B60W 30/10; B60W 30/18009; B60W 30/181; B60W 30/18145; B60W 40/105; B60W 50/12; B60W 60/001

See application file for complete search history.

(56) References Cited

U.S. PATENT DOCUMENTS

| | | | | |
|---|---|---|---|---|
| 2014/0240091 | A1* | 8/2014 | Talty | G07C 9/00309 |
| | | | | 340/5.62 |
| 2016/0014206 | A1* | 1/2016 | Isobe | H04W 4/80 |
| | | | | 455/557 |
| 2016/0269456 | A1* | 9/2016 | Ricci | B60K 35/00 |
| 2016/0316349 | A1* | 10/2016 | Lee | H04M 1/575 |
| 2017/0349183 | A1* | 12/2017 | Sen | B60W 50/085 |

FOREIGN PATENT DOCUMENTS

| | | |
|---|---|---|
| KR | 10-1999-0009136 | 2/1999 |
| KR | 10-2009-0045470 | 5/2009 |
| KR | 101373835 B1 * | 3/2014 |
| KR | 10-2015-0055746 | 5/2015 |
| KR | 10-1708657 | 2/2017 |

OTHER PUBLICATIONS

Lee, Method and apparatus for adaptively displaying play types of remote contents according to communication state of wireless networks, Mar. 14, 2014, Machine English translation of KR 10-1373835 B1 (Year: 2014).*

* cited by examiner (a) [250km/h]

(b) [140km/h]

(a)

(b)

$d\_{V2I\_max}$ : MAXIMUM DISTANCE IN V2I COMMUNICATION
$d\_{V2I\_movie\_max}$ : MAXIMUM DISTANCE IN V2I BASED VIDEO TRANSMISSION

VEHICLE CONTROL APPARATUS PROVIDED IN VEHICLE AND CONTROL METHOD OF VEHICLE

CROSS-REFERENCE TO RELATED APPLICATIONS

This application is a continuation of International Application No. PCT/KR2017/013346, filed on Nov. 22, 2017, which claims the benefit of earlier filing date and right of priority to Korean Application No. 10-2017-0152407, filed on Nov. 15, 2017, the contents of which are all hereby incorporated by reference herein in their entirety.

TECHNICAL FIELD

The present disclosure relates to a vehicle control apparatus provided in a vehicle and a method for controlling the vehicle.

BACKGROUND

A vehicle is an apparatus capable of moving a user in the user-desired direction. A representative example of a vehicle may be an automobile.

For convenience of a user of a vehicle, various types of sensors and electronic devices are provided in the vehicle. Specifically, a study on an Advanced Driver Assistance System (ADAS) is actively conducted. In addition, an autonomous vehicle is actively under development.

A vehicle may be provided with various types of lamps. In general, the vehicle includes various vehicle lamps having a lighting function to facilitate recognition of articles or objects near the vehicle be recognized during driving at night, and a signaling function to notify a driving state of the vehicle to other vehicles or pedestrians.

For example, the vehicle may include devices that directly emit light using lamps, such as a head lamp for emitting light to a front side to ensure a driver's view, a brake lamp that is turned on when pressing the brake, turn indicator lamps that is used upon a left turn or a right turn.

As another example, reflectors that can reflect light to facilitate recognition of the vehicle from outside are mounted on front and rear sides of the vehicle.

Installation criteria and standards of the lamps for the vehicle are regulated by rules so that the lamps can fully function as desired.

Meanwhile, as the development of the advanced driving assist system (ADAS) is actively conducted in recent time, there is need to develop a technology to optimize user's convenience and safety while driving a vehicle.

In addition, according to recent development of 5G, a vehicle control technology has actively been developed based on a communication reliability that is required in 5G.

SUMMARY

One aspect of the present disclosure is to provide a vehicle control apparatus and method that are capable of receiving content from an external device and executing the content in an optimized manner.

Another aspect of the present disclosure is to provide a vehicle control apparatus and method that are capable of controlling a vehicle in an optimized manner to secure communication reliability required in receiving content from an external device.

Still another aspect of the present disclosure is to provide a user interface capable of providing content that can be received from an external device based on current communication reliability in an optimized manner.

The tasks to be solved in the present disclosure may not be limited to the aforementioned, and other problems to be solved by the present disclosure will be obviously understood by a person skilled in the art based on the following description.

To achieve these and other advantages and in accordance with the purpose of this specification, particular implementations of the present disclosure provides a vehicle control apparatus that includes a communication interface, a display, and a processor. The communication interface may be configured to enable communication with an external device. The processor may be configured to control the display to activate a graphic object representative of a content item that is executable based on communication reliability between the external device and the communication interface.

In some implementations, the vehicle control apparatus can optionally include one or more of the following features. The vehicle control apparatus may be included in a vehicle. The communication reliability between the external device and the communication interface may decrease based on a relative speed between the external device and the vehicle increasing, and may increase based on a distance between the external device and the vehicle increasing. A communication area that has the communication reliability may become smaller based on the relative speed between the external device and the vehicle increasing.

The processor may be configured to receive the content item from the external device through the communication interface, and execute the content item on the display. The content item may include data indicative of communication reliability that is preset to execute the content item on the display.

The vehicle control apparatus may be included in a vehicle. The processor may be configured to, based on at least one of a current vehicle speed or a distance between the vehicle and the external device, determine current communication reliability between the external device and the communication interface, and based on the current communication reliability and information related to a plurality of content items that are received from the external device, determine at least one type of content items that is executable based on the current communication reliability. The processor may be configured to, based on the information related to the plurality of content items that are received from the external device, output, using the display, a plurality of graphic objects that represent the plurality of content items, activate a first graphic object representative of a first content item to permit execution of the first content item, the first content being executable based on the current communication reliability among the plurality of content items, and deactivate a second graphic object representative of a second content item to restrict execution of the second content item, the second content item being not executable based on the current communication reliability among the plurality of content items. The processor may be configured to output, using the display, information that indicates at least one of the current vehicle speed or the current communication reliability. The processor may be configured to, based on a user selection of the first graphic object, stream the first content item from the external device and execute the first content item, or download the first content item from the external device. Streaming the first content item may include streaming the first content item from the external device based on the vehicle being in an autonomous driving mode. The processor may be configured to, based on (i) a user selection of the first graphic object and (ii) the vehicle being in a manual driving mode, receive the first content item from the external device such that the first content item has different qualities based on driving modes of the vehicle. The processor may be configured to, based on (i) a user selection of the first graphic object and (ii) the vehicle being in the manual driving mode, output, using the display, information inquiring whether to switch the manual driving mode to an autonomous driving mode. The processor may be configured to, based on a user selection of switching the manual driving mode to the autonomous driving mode, receive the first content item from the external device so that the first content has a first quality, and based on the manual driving mode of the vehicle being maintained, receive the first content item from the external device so that the first content has a second quality that is lower than the first quality.

The display may be configured to display at least one graphic object that represents at least one content item. The processor may be configured to, based on a user selection of one of the at least one graphic object, control a vehicle speed based on (i) first communication reliability that is required for executing a content item that is represented by the selected one of the at least one graphic object and (ii) second communication reliability, the second communication reliability being a current communication reliability between the external device and the communication interface. The processor may be configured to determine the second communication reliability based on a communication distance between the external device and a vehicle that includes the vehicle control apparatus, and based on the second communication reliability being lower than the first communication reliability, increase a speed of the vehicle to change the communication distance so that the second communication reliability reaches the first communication reliability. The processor may be configured to, based on the second communication reliability reaching the first communication reliability, maintain the speed of the vehicle so that the second communication reliability is not lower than the first communication reliability.

The vehicle control apparatus may be included in a vehicle. The processor may be configured to, based on (i) a user selection of the graphic object and (ii) the vehicle being in a manual driving mode, switch the manual driving mode to an autonomous driving mode and download the content item from the external device, and based on the content item being downloaded, switch the autonomous driving mode to the manual driving mode.

The vehicle control apparatus may be included in a first vehicle. The external device may be a second vehicle. The processor may be configured to, based on a user selection of one of a plurality of graphic objects outputted on the display, adjust a distance between the first vehicle and the second vehicle to secure communication reliability that is associated with a content item, wherein the selected one of the plurality of graphic objects represents the content item.

The vehicle control apparatus may be included in a first vehicle. The external device may be a second vehicle. The processor may be configured to: receive, using the communication interface, a request signal that includes a request for content transmission from the external device, output, using the display, information that represents the request signal, and control a vehicle speed based on a user input for accepting the request using the information. The processor may be configured to adjust a distance between the first vehicle and the second vehicle such that communication reliability between the first vehicle and the second vehicle is higher than communication reliability that is associated with the content item requested by the request signal.

Particular implementations of the present disclosure described herein provide a vehicle that includes a vehicle control apparatus. The vehicle control apparatus may include a communication interface, a display, and a processor. The communication interface may be configured to enable communication with an external device. The processor may be configured to control the display to activate a graphic object representative of a content item that is executable based on communication reliability between the external device and the communication interface.

Particular implementations of the present disclosure described herein provide a method for controlling a vehicle. The method may include establishing communication with an external device; and activating a graphic object representative of a content item that is executable based on communication reliability between the vehicle and the external device.

To achieve these and other advantages and in accordance with the purpose of this specification, as embodied and broadly described herein, there is provided a vehicle control apparatus, including: a communication unit connected to enable communication with an external device; a display; and a processor configured to control the display, based on communication reliability with the external device, to activate a graphic object of content executable at the communication reliability.

In some implementations disclosed herein, communication reliability between the external device and the communication unit decreases as a relative speed between the external device and a vehicle increases, and increases as a distance between the external device and the vehicle increases, and wherein a size of a communication area having communication reliability of a predetermined value or higher becomes smaller as a relative speed between the external device and the vehicle increases.

In some implementations disclosed herein, the content is received from the external device through the communication unit and executed on the display, and communication reliability needed in the execution is preset in the content.

In some implementations disclosed herein, the processor, based on at least one of a current vehicle speed and a distance between the vehicle and the external device, determines a current communication reliability between the external device and the communication unit, and based on information related to a plurality of content received from the external device and the current communication reliability, determines a type of content executable at the current communication reliability among graphic objects of the plurality of contents.

In some implementations disclosed herein, graphic objects of the plurality of contents are displayed on the display based on the information related to the plurality of contents received from the external device, and the processor activates a graphic object of a first content that is executable at the current communication reliability among the plurality of contents so that execution of the first content is allowed, and deactivates a graphic object of a second content that is not executable at the current communication reliability among the plurality of contents so that execution of the second content is restricted.

In some implementations disclosed herein, the display further displays information indicating a current vehicle speed or the current communication reliability.

In some implementations disclosed herein, the processor, when a touch is applied to the graphic object of the first content, receives the first content from the external device in a streaming manner to execute the first content, or downloads the first content from the external device.

In some implementations disclosed herein, the receiving of the first content in a streaming manner is performed when a driving mode of a vehicle is in an autonomous driving mode.

In some implementations disclosed herein, the processor, when a touch is applied to the graphic object of the first content while a driving mode of a vehicle is in a manual driving mode, receives the first content from the external device so as to have different qualities based on the driving mode of the vehicle.

In some implementations disclosed herein, the processor, based on a touch applied to the graphic object of the first content while the driving mode of the vehicle is in the manual driving mode, outputs screen information inquiring whether to switch the driving mode of the vehicle to an autonomous driving mode.

In some implementations disclosed herein, the processor, when the driving mode of the vehicle is switched to the autonomous driving mode through the screen information, receives the first content from the external device so that the first content has a first quality, and when the driving mode of the vehicle is maintained in the manual driving mode through the screen information, receives the first content from the external device so that the first content has a second quality that is lower than the first quality.

In some implementations disclosed herein, when the display displays a graphic object of at least one of a plurality of content thereon and a touch is applied to a graphic object of any one of the content in the at least one of the plurality of contents, the processor controls a vehicle speed based on a first communication reliability required for executing the any one of the plurality of contents and a second communication reliability with a current external device.

In some implementations disclosed herein, the second communication reliability is determined based on a communication distance between the external device and the vehicle, and the processor, when the second communication reliability is lower than the first communication reliability, increases a speed of the vehicle so that the vehicle enters a communication distance having the first communication reliability from the external device.

In some implementations disclosed herein, the processor, when the vehicle enters a communication distance having the first communication reliability from the external device, maintains the speed of the vehicle at a constant speed so that the second communication reliability is not lower than the first communication reliability.

In some implementations disclosed herein, the processor, when a touch is applied to the graphic object of the content while a driving mode of a vehicle is in a manual driving mode, switches the driving mode of the vehicle to an autonomous driving mode while downloading the content from the external device, and when the content is downloaded, restores the driving mode of the vehicle from the autonomous driving mode to the manual driving mode.

In some implementations disclosed herein, the external device is another vehicle, and the processor, when any one of the graphic objects of the content displayed on the display is selected, adjusts a distance between the vehicle and the another vehicle so as to secure communication reliability associated with the content of the selected graphic object.

In some implementations disclosed herein, the external device is another vehicle, and the processor, when a request signal demanding content transmission from the external device is received by the communication unit, outputs screen information corresponding to the request signal on the display, and controls a vehicle speed based on a reception of a user input for accepting the request signal through the screen information.

In some implementations disclosed herein, the processor adjusts a distance between the vehicle and the another vehicle so that communication reliability between the vehicle and the another vehicle is higher than communication reliability associated with the requested content.

To achieve these and other advantages and in accordance with the purpose of the present disclosure, as embodied and broadly described herein, there is provided a vehicle including the vehicle control apparatus described herein.

A method for controlling a vehicle according to some implementations of the present disclosure may include connecting to enable communication with an external device, and based on communication reliability with the external device, activating a graphic object of content executable at the communication reliability.

The details of various implementations are included in the detailed description and drawings.

According to some implementations of the present disclosure, one or more of the following effects can be provided.

First, the present disclosure may provide a user interface that is capable of outputting content that is received from an external device in an optimized manner by determining a type of the content that can be outputted in a vehicle according to current communication reliability.

Second, the present disclosure may provide a new method for, based on a request for execution of content through a display, controlling a vehicle to satisfy communication reliability in executing the corresponding content.

Third, the present disclosure may provide a user with content through an external device in an optimized environment even while a vehicle is traveling, by determining a type of content executable according to communication reliability or varying a driving state of the vehicle based on communication reliability required in the content that is requested to be executed.

The advantages of the present disclosure are not limited to those mentioned above, and other advantages may be clearly understood by those skilled in the art from the description of the appended claims.

DETAILED DESCRIPTION

Figure 1:
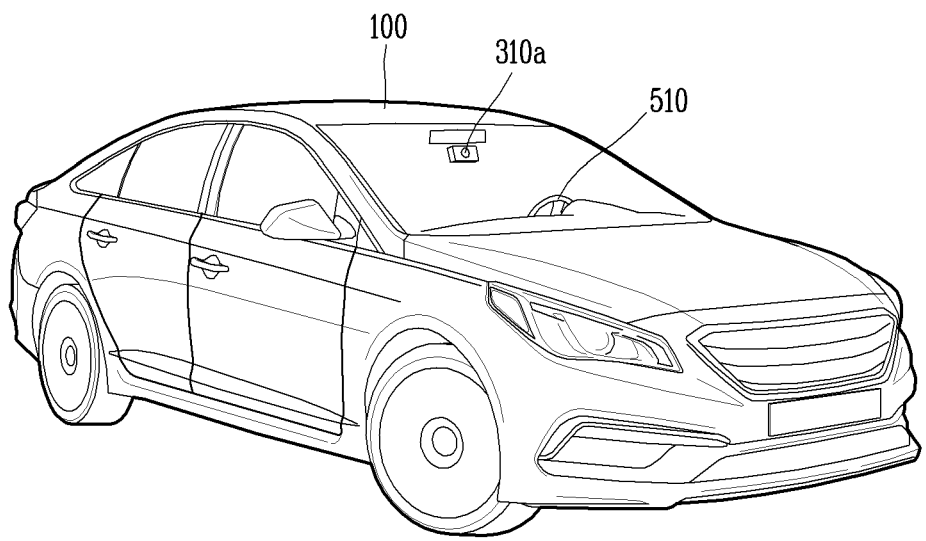
FIG. 1 illustrates an appearance of an example vehicle.
Figure 1:
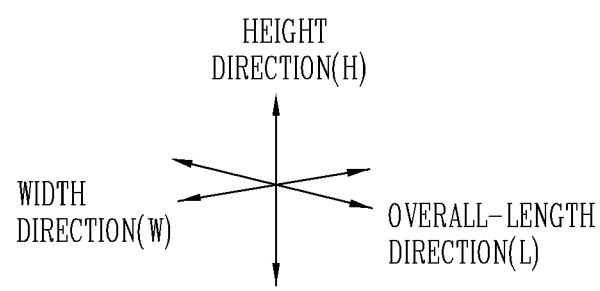
Figure 2:
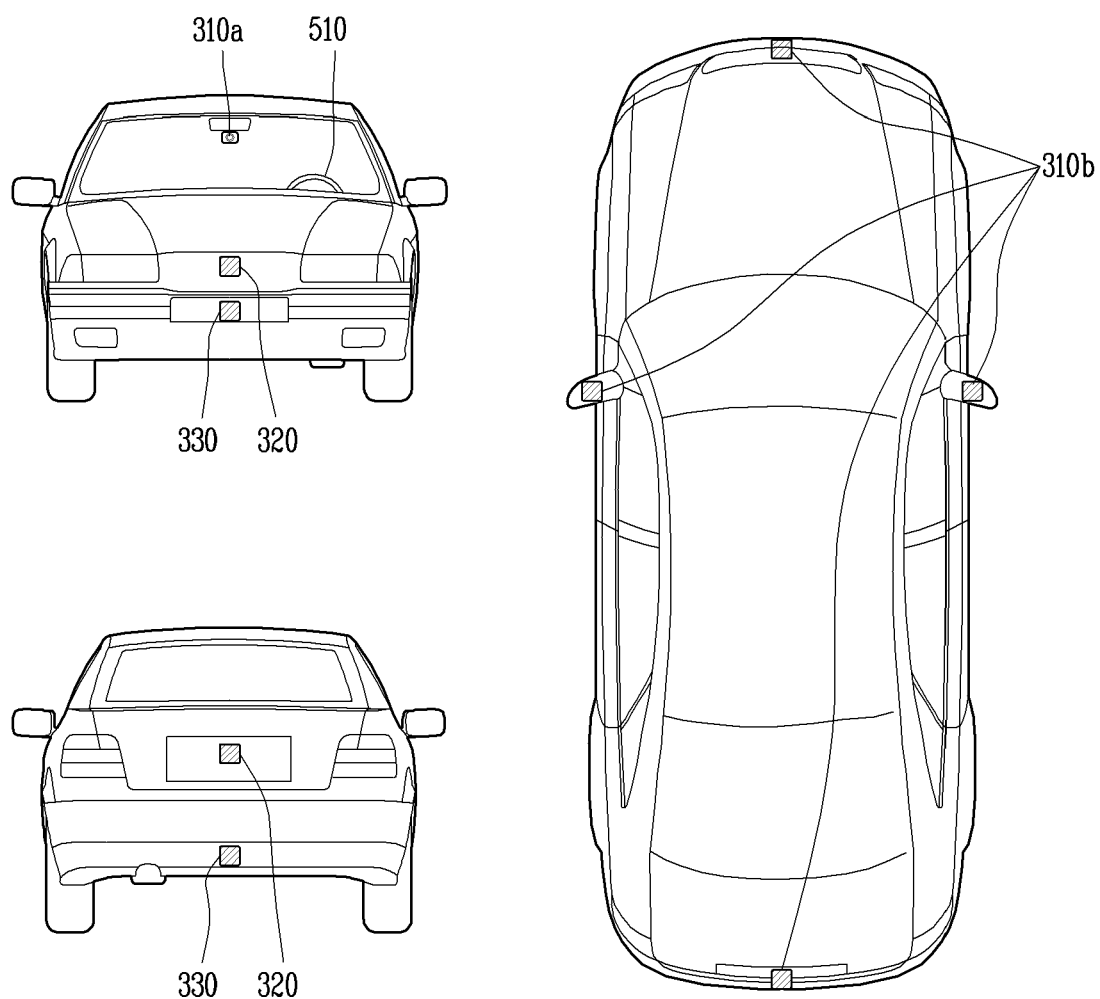
FIG. 2 illustrates an appearance of the vehicle from various angles.
Figure 3:
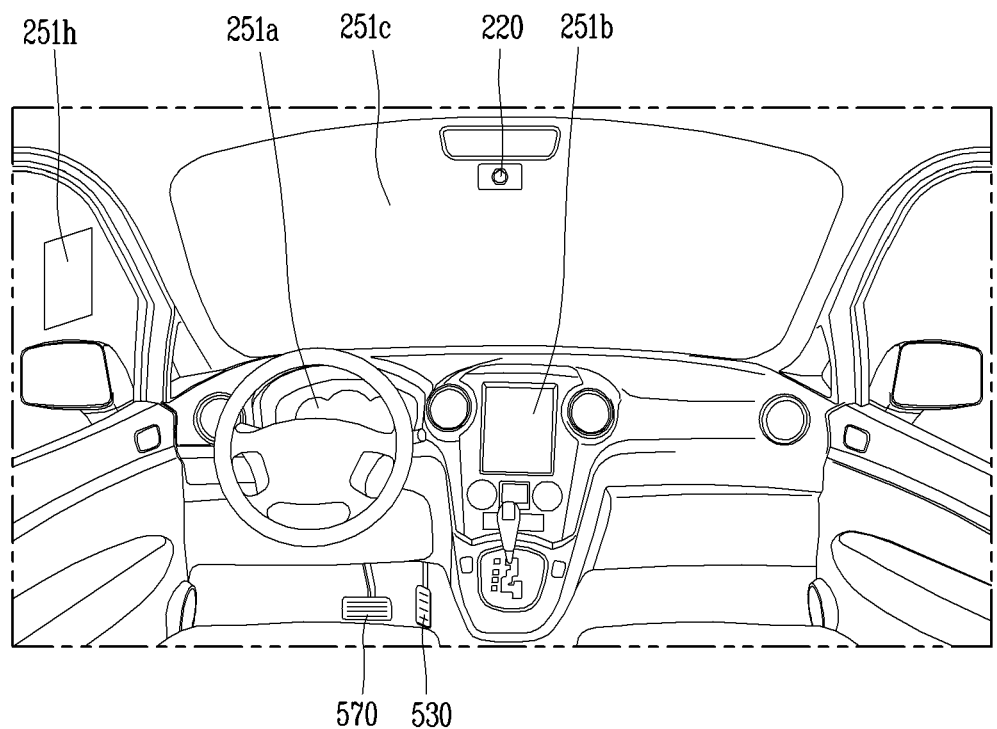
FIGS. 3 and 4 illustrate example interiors of the vehicle.
Figure 4:
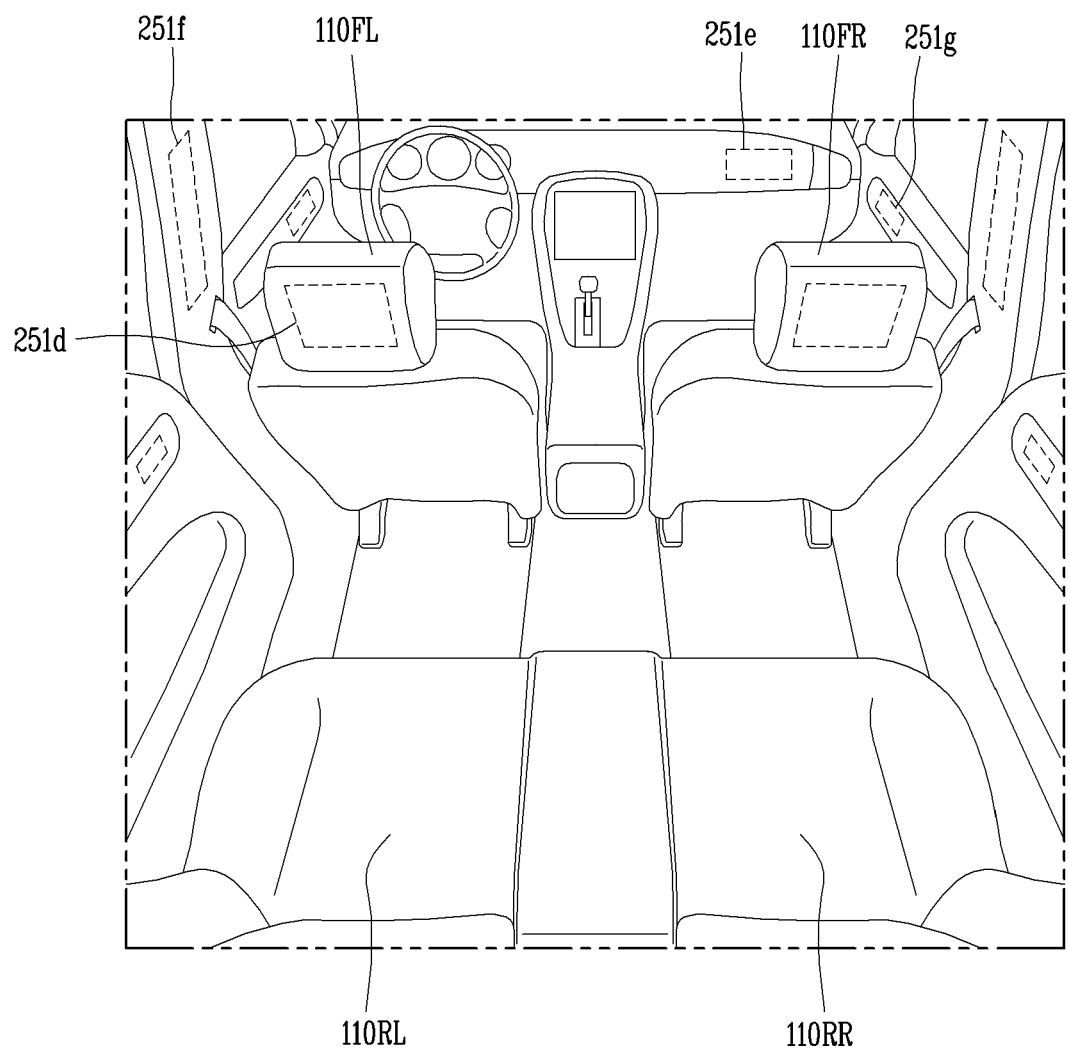

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, detailed explanation of known functions or constructions may be omitted but would be understood by those skilled in the art. The accompanying drawings are used to help easily understand the present disclosure and it should be understood that the idea of the present disclosure is not limited by the accompanying drawings. The present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to some implementations of the present disclosure may be understood as a car, a motorcycle, or other suitable types of vehicles. Hereinafter, the vehicle will be described primarily as a car.

The vehicle according to some implementations of the present disclosure may include a vehicle having an internal combustion engine as a power source, a hybrid vehicle having an engine and an electric motor as power sources, an electric vehicle having an electric motor as a power source, and the like.

In the following description, a left side of a vehicle or the like refers to a left side in a driving direction of the vehicle, and a right side of the vehicle or the like refers to a right side in the driving direction.

As illustrated in FIGS. 1 to 7, a vehicle 100 may include wheels turning by a driving force, and a steering input device 510 to adjust a driving (ongoing, moving) direction of the vehicle 100.

The vehicle 100 may be an autonomous vehicle. The vehicle 100 may be switched into an autonomous mode or a manual mode based on a user input. For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300. For example, the vehicle 100 may be switched from the manual mode into the autonomous mode or from the autonomous module into the manual mode based on driving environment information generated in the object detecting apparatus 300.

In some implementations, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

In some implementations, when the vehicle 100 is driven in the autonomous mode, the autonomous vehicle 100 may be driven based on an operation system 700. For example, the autonomous vehicle 100 may be driven based on information, data or signal generated in a driving system 710, a parking exit system 740 and a parking system 750. When the vehicle 100 is driven in the manual mode, the autonomous vehicle 100 may receive a user input to drive by a driving control apparatus 500. The vehicle 100 may be driven based on the user input received through the driving control apparatus 500.

Figure 7:
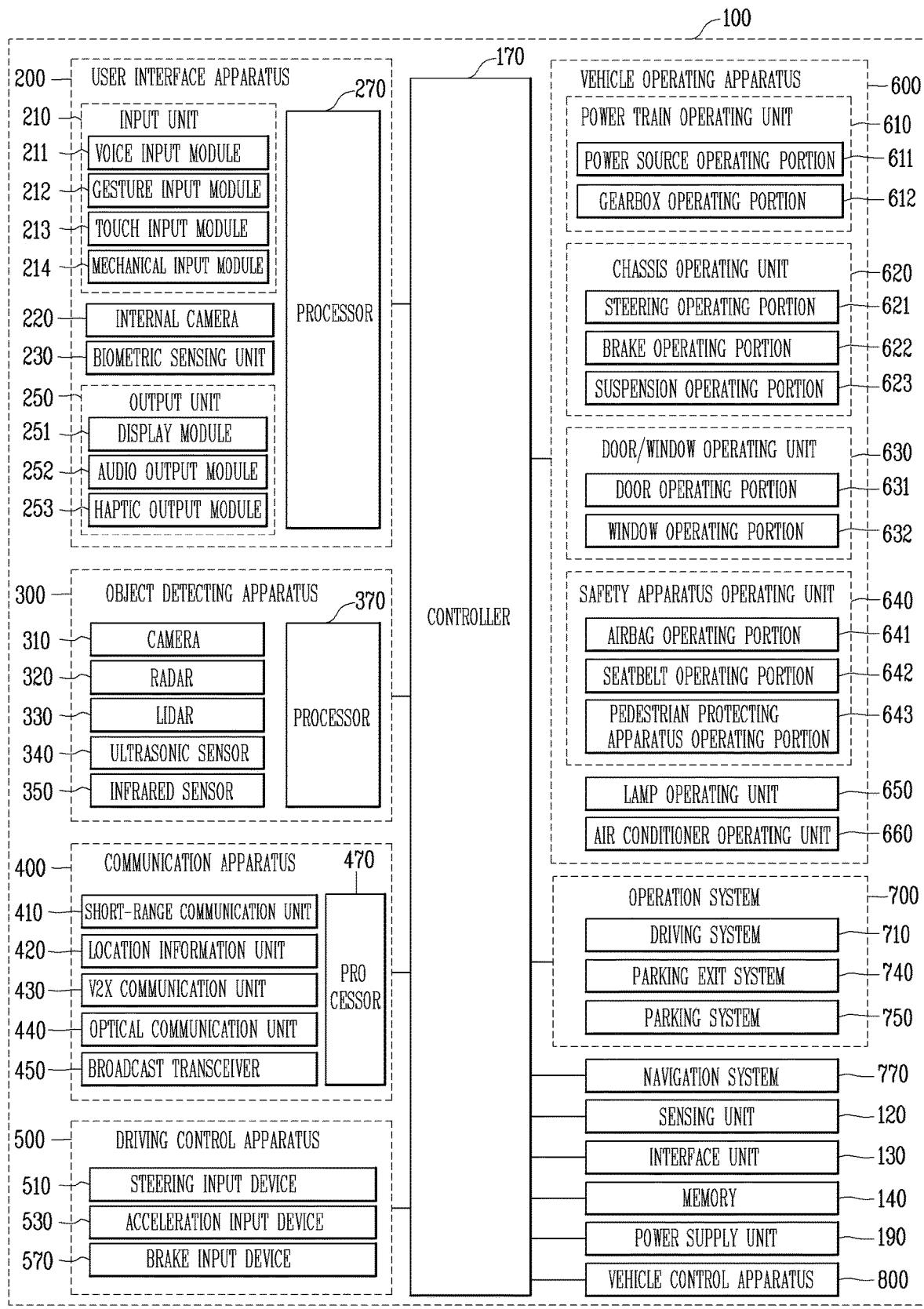
FIG. 7 is a block diagram of an example vehicle.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190. The vehicle 100 may include more components in addition to the components that are explained in this specification or may exclude one or more of the components described in this specification.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270. The user interface apparatus 200 may include more components in addition to the components that are described in this specification or may exclude one or more of the components described in this specification.

The input unit 210 may allow a user to input information. Data collected in the input unit 210 may be analyzed by the processor 270 and processed as a user's control command.

The input unit 210 may be disposed inside the vehicle. For example, the input unit 210 may be disposed on or around a steering wheel, an instrument panel, a seat, each pillar, a door, a center console, a headlining, a sun visor, a windshield, a window, or other suitable areas in the vehicle.

The input unit 210 may include an audio input unit 211, a gesture input unit 212, a touch input unit 213, and a mechanical input unit 214.

The audio input unit 211 may convert a user's voice input into an electric signal. The converted electric signal may be provided to the processor 270 or the controller 170. The audio input unit 211 may include at least one microphone.

The gesture input unit 212 may convert a user's gesture input into an electric signal. The converted electric signal may be provided to the processor 270 or the controller 170. The gesture input unit 212 may include at least one of an infrared sensor and an image sensor to detect the user's gesture input. According to some implementations, the gesture input unit 212 may detect a user's three-dimensional (3D) gesture input. For example, the gesture input unit 212 may include a light emitting diode configured to output a plurality of infrared rays or a plurality of image sensors. The gesture input unit 212 may detect the user's 3D gesture input by a time of flight (TOF) method, a structured light method or a disparity method.

The touch input unit 213 may convert the user's touch input into an electric signal. The converted electric signal may be provided to the processor 270 or the controller 170. The touch input unit 213 may include a touch sensor to detect the user's touch input. According to some implementations, the touch input unit 213 may be integrated with the display 251 so as to implement a touch screen. The touch screen may provide an input interface and an output interface between the vehicle 100 and the user.

The mechanical input unit 214 may include at least one of a button, a dome switch, a jog wheel and a jog switch. An electric signal generated by the mechanical input unit 214 may be provided to the processor 270 or the controller 170. The mechanical input unit 214 may be arranged on a steering wheel, a center fascia, a center console, a cockpit module, a door, and/or other suitable areas in the vehicle.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing unit 230 may include a sensor to detect the user's biometric information and acquire fingerprint information and heart rate information regarding the user using the sensor. The biometric information may be used for user authentication.

The output unit 250 may generate an output related to a visual, audible or tactile signal. The output unit 250 may include at least one of a display 251, an audio output unit 252 and a haptic output unit 253.

The display 251 may output graphic objects corresponding to various types of information. The display 251 may include at least one of a liquid crystal display (LCD), a thin film transistor-LCD (TFT LCD), an organic light-emitting diode (OLED), a flexible display, a three-dimensional (3D) display, or an e-ink display.

The display 251 may be inter-layered or integrated with a touch input unit 213 to implement a touch screen. The display 251 may be implemented as a head up display (HUD). When the display 251 is implemented as the HUD, the display 251 may be provided with a projecting module so as to output information through an image which is projected on a windshield or a window.

The display 251 may include a transparent display. The transparent display may be attached to the windshield or the window. The transparent display may have a predetermined degree of transparency and output a predetermined screen thereon. The transparent display may include at least one of a thin film electroluminescent (TFEL), a transparent OLED, a transparent LCD, a transmissive transparent display or a transparent LED display. The transparent display may have adjustable transparency.

In some implementations, the user interface apparatus 200 may include a plurality of displays 251a to 251g.

The display 251 may be disposed on or around a steering wheel, instrument panels 251a, 251b, 251e, a seat 251d, each pillar 251f, a door 251g, a center console, a headlining, and/or a sun visor, and/or implemented on or around a windshield 251c and/or a window 251h.

The audio output unit 252 converts an electric signal provided from the processor 270 or the controller 170 into an audio signal for output. To this end, the audio output unit 252 may include at least one speaker.

The haptic output unit 253 generates a tactile output. For example, the haptic output unit 253 may vibrate the steering wheel, a safety belt, a seat 110FL, 110FR, 110RL, 110RR such that the user can recognize such an output.

The processor 270 may control an overall operation of each unit of the user interface apparatus 200. In some implementations, the user interface apparatus 200 may include a plurality of processors 270 or may not include any processor 270. When the processor 270 is not included in the user interface apparatus 200, the user interface apparatus 200 may be operated according to a control of a processor of another apparatus within the vehicle 100 or the controller 170.

The user interface apparatus 200 may also be referred to herein as a display apparatus for vehicle. In some implementations, the user interface apparatus 200 may operate according to the control of the controller 170.

Referring still to FIG. 7, the object detecting apparatus 300 is an apparatus to detect an object located at outside of the vehicle 100. The object may be a variety of objects associated with driving or operation of the vehicle 100.

Figure 5:
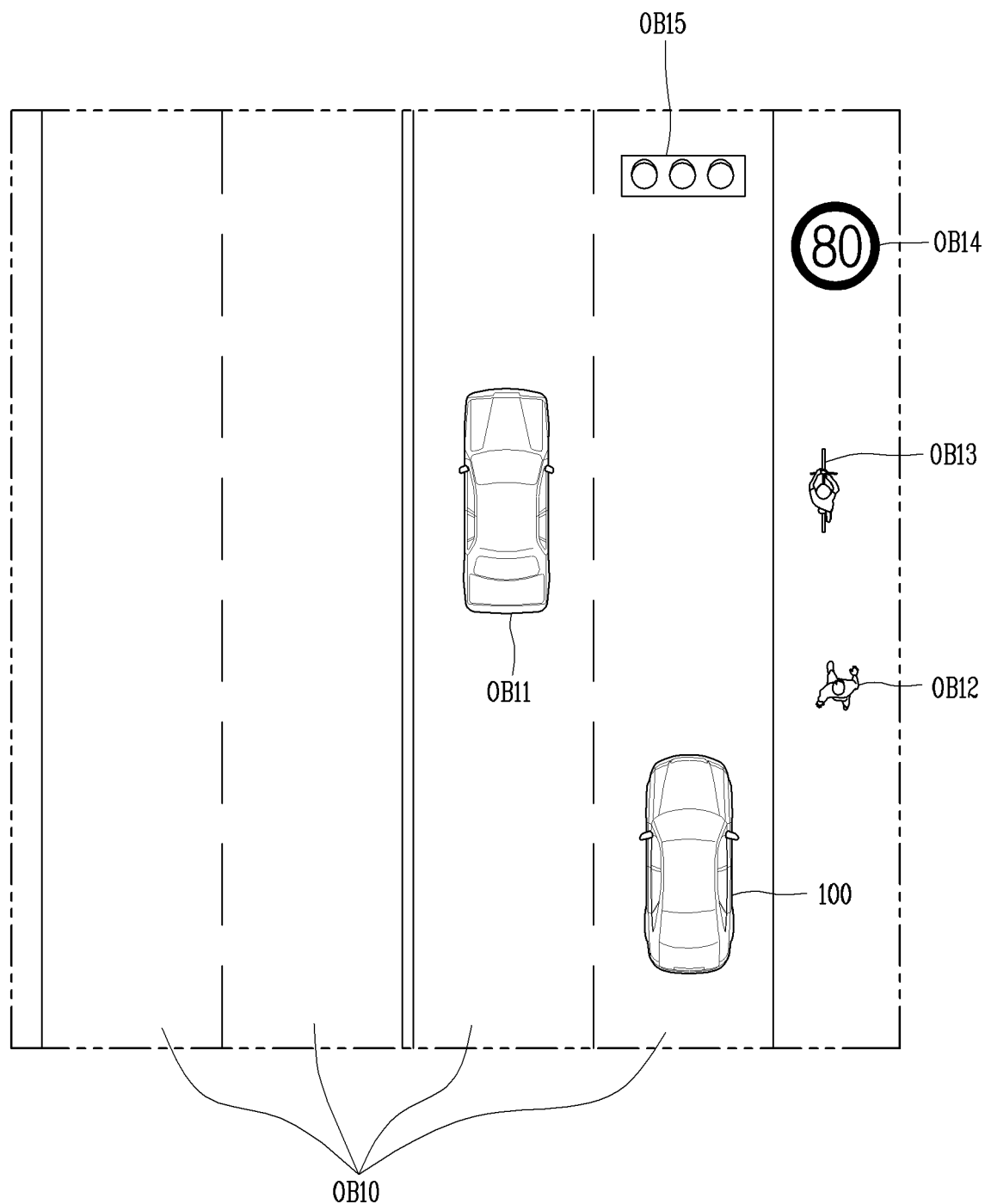
FIGS. 5 and 6 illustrate example objects.
Figure 6:
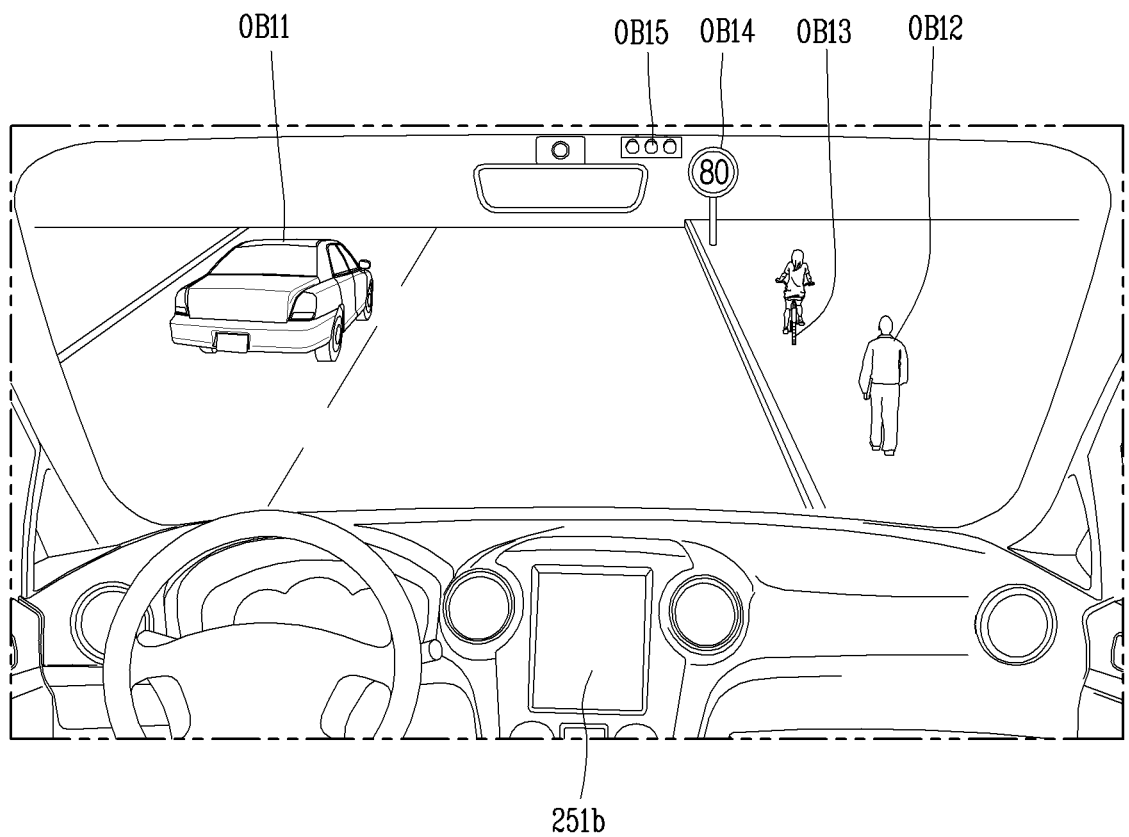

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal, and other objects.

The lane OB10 may be a driving lane, a lane next to the driving lane or a lane on which another vehicle comes in an opposite direction to the vehicle 100. Each lane OB10 may include left and right lines forming the lane.

The another vehicle OB11 may be a vehicle which is moving near the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light. The road may include a road surface, a curve, an upward slope, a downward slope and the like. The structure may be an object that is located near a road and fixed on the ground. For example, the structure may include a streetlamp, a roadside tree, a building, an electric pole, a traffic light, a bridge and the like. The terrain may include a mountain, a hill and the like.

In some implementations, objects may be classified into moving objects and fixed objects. For example, the moving objects may include another vehicle and a pedestrian. The fixed objects may include a traffic signal, a road and a structure, for example.

Referring to FIG. 7, the object detecting apparatus 300 may include a camera 310, a radar 320, a LiDAR 330, an ultrasonic sensor 340, an infrared sensor 350 and a processor 370. In some implementations, the object detecting apparatus 300 may further include other components in addition to the components described herein, or may exclude one or more of the components described herein.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera. In some implementations, the camera 310 may be disposed adjacent to a front windshield within the vehicle to acquire a front image of the vehicle. Alternatively or in addition, the camera 310 may be disposed adjacent to a front bumper or a radiator grill. Alternatively or in addition, the camera 310 may be disposed adjacent to a rear glass within the vehicle to acquire a rear image of the vehicle. Alternatively or in addition, the camera 310 may be disposed adjacent to a rear bumper, a trunk or a tail gate. Alternatively or in addition, the camera 310 may be disposed adjacent to at least one of side windows within the vehicle to acquire a side image of the vehicle. Alternatively or in addition, the camera 310 may be disposed adjacent to a side mirror, a fender or a door. The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods. The radar 320 may detect an object in a time of flight (TOF) manner or a phase-shift manner through the medium of the electric wave, and detect a position of the detected object, a distance from the detected object and a relative speed with the detected object. The radar 320 may be disposed on an appropriate position outside the vehicle to detect an object which is located at a front, rear or side of the vehicle.

The LiDAR 330 may include laser transmitting and receiving portions. The LiDAR 330 may be implemented in a time of flight (TOF) manner or a phase-shift manner. The LiDAR 330 may be implemented as a drive type or a non-drive type. For the drive type, the LiDAR 330 may be rotated by a motor and detect object near the vehicle 100. For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOF manner or a phase-shift manner through the medium of a laser beam, and detect a position of the detected object, a distance from the detected object and a relative speed with the detected object. The LiDAR 330 may be disposed on an appropriate position outside the vehicle to detect an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object. The ultrasonic sensor 340 may be disposed on an appropriate position outside the vehicle to detect an object located at the front, rear or side of the vehicle.

The infrared sensor 350 may include infrared light transmitting and receiving portions. The infrared sensor 350 may detect an object based on infrared light, and detect a position of the detected object, a distance from the detected object and a relative speed with the detected object. The infrared sensor 350 may be disposed on an appropriate position outside the vehicle to detect an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave, which is generated when an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam, which is generated when an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave, which is generated when an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light, which is generated when emitted infrared light is reflected from the object, and track the object. The processor 370 may execute operations, such as a calculation of a distance from the object, a calculation of a relative speed with the object and the like, based on the infrared light.

According to some implementations, the object detecting apparatus 300 may include a plurality of processors 370 or does not include the processor 370. In some implementations, each of the camera 310, the radar 320, the LiDAR 330, the ultrasonic sensor 340 and the infrared sensor 350 may include a processor in an individual manner. When the processor 370 is not included in the object detecting apparatus 300, the object detecting apparatus 300 may operate according to the control of a processor of an apparatus within the vehicle 100 or the controller 170.

Referring to FIG. 7, the object detecting apparatus 300 may operate according to the control of the controller 170. The communication apparatus 400 is an apparatus to perform communication with an external device. Here, the external device may be another vehicle, a mobile terminal or a server.

The communication apparatus 400 may perform the communication by including at least one of a transmitting antenna, a receiving antenna, and radio frequency (RF) circuit and RF device to implement various communication protocols.

The communication apparatus 400 may include a short-range communication unit 410, a location information unit 420, a V2X communication unit 430, an optical communication unit 440, a broadcast transceiver 450 and a processor 470. According to some implementations, the communication apparatus 400 may further include other components in addition to the components described herein, or may exclude one or more of the components described herein.

The short-range communication unit 410 is a unit to facilitate short-range communications. Suitable technologies to implement such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication unit 410 may construct short-range area networks to perform short-range communication between the vehicle 100 and at least one external device.

The location information unit 420 is a unit to acquire position information. For example, the location information unit 420 may include a Global Positioning System (GPS) module or a Differential Global Positioning System (DGPS) module.

The V2X communication unit 430 is a unit to perform wireless communications with a server (Vehicle to Infra: V2I), another vehicle (Vehicle to Vehicle: V2V), or a pedestrian (Vehicle to Pedestrian: V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit to perform communication with an external device through the medium of light. The optical communication unit 440 may include a light-emitting diode to convert an electric signal into an optical signal and send the optical signal to the exterior, and a photodiode to convert the received optical signal into an electric signal.

According to some implementations, the light-emitting diode may be integrated with lamps provided on the vehicle 100.

The broadcast transceiver 450 is a unit to receive a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400. According to some implementations, the communication apparatus 400 may include a plurality of processors 470 or does not include the processor 470. When the processor 470 is not included in the communication apparatus 400, the communication apparatus 400 may operate according to the control of a processor of another device within the vehicle 100 or the controller 170.

In some implementations, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus. In some implementations, the communication apparatus 400 may operate according to the control of the controller 170.

Referring still to FIG. 7, the driving control apparatus 500 is an apparatus to receive a user input for driving. In the manual mode, the vehicle 100 may be operated based on a signal provided by the driving control apparatus 500. The driving control apparatus 500 may include a steering input device 510, an acceleration input device 530, and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some implementations, the steering input device may also be configured in a shape of a touch screen, a touch pad or a button.

The acceleration input device 530 may receive an input to accelerate the vehicle 100 from the user. The brake input device 570 may receive an input to brake the vehicle 100 from the user. Each of the acceleration input device 530 and the brake input device 570 is preferably configured in the form of a pedal. According to some implementations, the acceleration input device or the brake input device may also be configured in a shape of a touch screen, a touch pad or a button.

In some implementations, the driving control apparatus 500 may operate according to the control of the controller 170.

Referring still to FIG. 7, the vehicle operating apparatus 600 is an apparatus to electrically control operations of various devices within the vehicle 100. The vehicle operating apparatus 600 may include a power train operating portion 610, a chassis operating portion 620, a door/window operating portion 630, a safety apparatus operating portion 640, a lamp operating portion 650, and an air-conditioner operating portion 660. According to some implementations, the vehicle operating apparatus 600 may further include other components in addition to the components described herein, or may exclude one or more of the components described herein.

In some implementations, the vehicle operating apparatus 600 may include a processor. Alternatively or in addition, each unit of the vehicle operating apparatus 600 may individually include a processor.

The power train operating portion 610 may control an operation of a power train device. The power train operating portion 610 may include a power source operating portion 611 and a gearbox operating portion 612.

The power source operating portion 611 may perform a control for a power source of the vehicle 100. For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170. In other example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox. The gearbox operating portion 612 may adjust a state of the gearbox. The gearbox operating portion 612 may change the state of the gearbox into drive (forward) (D), reverse (R), neutral (N) or parking (P). For example, when an engine is the power source, the gearbox operating portion 612 may adjust a locked state of a gear in the drive (D) state.

The chassis operating portion 620 may control an operation of a chassis device. The chassis operating portion 620 may include a steering operating portion 621, a brake operating portion 622, and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100. In some implementations, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road. In some implementations, the suspension operating portion 623 may individually control each of a plurality of suspensions.

The door/window operating portion 630 may perform an electronic control for a door apparatus or a window apparatus within the vehicle 100. The door/window operating portion 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

Referring still to FIG. 7, the safety apparatus operating portion 640 may perform an electronic control for various safety apparatuses within the vehicle 100. The safety apparatus operating portion 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

Referring still to FIG. 7, the lamp operating portion 650 may perform an electronic control for various lamp apparatuses within the vehicle 100.

The air-conditioner operating portion 660 may perform an electronic control for an air conditioner within the vehicle 100. For example, the air-conditioner operating portion 660 may control the air conditioner to supply cold air into the vehicle when internal temperature of the vehicle is high.

In some implementations, the vehicle operating apparatus 600 may include a processor. Alternatively or in addition, each unit of the vehicle operating apparatus 600 may individually include a processor. In some implementations, the vehicle operating apparatus 600 may operate according to the control of the controller 170.

Referring still to FIG. 7, the operation system 700 is a system that controls various driving modes of the vehicle 100. The operation system 700 may operate in an autonomous driving mode. The operation system 700 may include a driving system 710, a parking exit system 740 and a parking system 750. According to some implementations, the operation system 700 may further include other components in addition to the components described herein, or may exclude one or more of the components described herein.

In some implementations, the operation system 700 may include a processor.

Alternatively or in addition, each unit of the operation system 700 may individually include a processor.

According to some implementations, the operation system 700 may be part of the controller 170 when it is implemented in a software configuration.

In some implementations, the operation system 700 may include at least one of the user interface apparatus 200, the object detecting apparatus 300, the communication apparatus 400, the vehicle operating apparatus 600, or the controller 170.

The driving system 710 may perform driving of the vehicle 100. The driving system 710 may receive navigation information from a navigation system 770, transmit a control signal to the vehicle operating apparatus 600, and perform driving of the vehicle 100. The driving system 710 may receive object information from the object detecting apparatus 300, transmit a control signal to the vehicle operating apparatus 600 and perform driving of the vehicle 100. The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot. The parking exit system 740 may receive navigation information from the navigation system 770, transmit a control signal to the vehicle operating apparatus 600, and perform the exit of the vehicle 100 from the parking lot. The parking exit system 740 may receive object information from the object detecting apparatus 300, transmit a control signal to the vehicle operating apparatus 600 and perform the exit of the vehicle 100 from the parking lot. The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100. The parking system 750 may receive navigation information from the navigation system 770, transmit a control signal to the vehicle operating apparatus 600, and park the vehicle 100. The parking system 750 may receive object information from the object detecting apparatus 300, transmit a control signal to the vehicle operating apparatus 600 and park the vehicle 100. The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle. The navigation system 770 may include a memory and a processor. The memory may store the navigation information. The processor may control an operation of the navigation system 770. According to implementations, the navigation system 770 may update prestored information by receiving information from an external device through the communication apparatus 400. According to some implementations, the navigation system 770 may be part of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path or interface that allows the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In addition or alternatively, the interface unit 130 may serve as a path or interface to supply electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data to control operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs to process or control the controller 170. According to implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Referring to FIG. 7, the vehicle 100 according to the present disclosure may include a vehicle control apparatus 800.

The vehicle control apparatus 800 may control at least one of those components illustrated in FIG. 7. From this perspective, the vehicle control apparatus 800 may include, be included in, or implemented by, the controller 170. In other implementations, the vehicle control apparatus 800 may be a separate device, independent of the controller 170. When the vehicle control apparatus 800 is implemented as a component independent of the controller 170, the vehicle control apparatus 800 may be provided on a part of the vehicle 100.

In some implementations, the vehicle control apparatus 800 described herein may include all kinds of devices capable of controlling the vehicle, and may be, for example, a mobile terminal. When the vehicle control apparatus 800 is a mobile terminal, the mobile terminal and the vehicle 100 may be connected to each other so as to perform communication in a wired/wireless manner. In addition, the mobile terminal may control the vehicle 100 in various ways in a communicatively connected state. When the vehicle control apparatus 800 is a mobile terminal, the processor 870 described herein may be a controller of the mobile terminal.

Hereinafter, the vehicle control apparatus 800 is described primarily as a component that is separate from the controller 170 for the sake of explanation. It is understood however that the functions, operations, and control methods described in relation to the vehicle control apparatus 800 may be executed by the controller 170 of the vehicle. That is, the description of the vehicle control apparatus 800 may be applied to the controller 170 in the same/like manner.

Also, the vehicle control apparatus 800 described herein may include some or all of the components illustrated in FIG. 7 and various components included in the vehicle. For the sake of explanation, the components illustrated in FIG.

7 and the various components included in the vehicle will be described with separate names and reference numbers.

Hereinafter, the vehicle control apparatus 800 is described in more detail with reference to the accompanying drawings.

Figure 8:
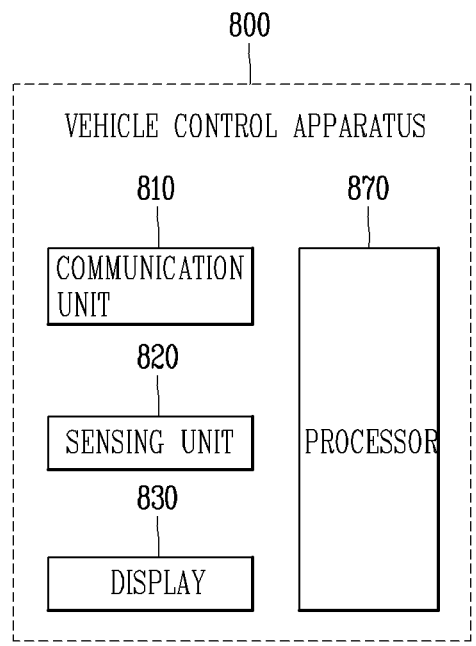
FIG. 8 is a block diagram of an example vehicle control apparatus.

FIG. 8 is a conceptual view of a vehicle control apparatus according to some implementations of the present disclosure.

The vehicle control apparatus 800 according to the present disclosure may include a communication unit 810, a sensing unit 820, a display 830, a processor 870 and the like.

The communication unit 810 may include, be included in, or implemented by, the communication device 400 described above. The communication unit 810 may be connected to a mobile terminal present inside the vehicle 100 to perform communication with the mobile terminal.

In one example, the vehicle control apparatus 800 (or vehicle 100) and the mobile terminal may be connected to each other to allow wireless communication therebetween through the communication unit 810. The vehicle control apparatus 800 and the mobile terminal may be wirelessly connected to each other so as to enable wireless communication with each other according to a user request. Alternatively or in addition, if they have been connected before to allow the wireless communication, the vehicle control apparatus and the mobile terminal may be wirelessly connected to enable the wireless communication therebetween, in response to an entrance of the mobile terminal into the vehicle.

The vehicle control apparatus 800 may control a mobile terminal through the communication unit 810.

The communication unit 810 may perform communication with an external device (e.g., a server, a cloud server (or a cloud), the Internet, etc.) existing outside the vehicle. The communication unit 810 may perform communication with another vehicle.

For example, the communication unit 810 may be connected to an external device existing outside the vehicle to perform communication with the external device. Here, the external device may include various kinds of communication devices that exist outside the vehicle and are capable of communication. Examples of the external device can include a road side unit (RSU), a server, the Internet, a cloud server, or another vehicle, which is installed or present on or near a road.

For example, when the communication unit 810 is connected to communicate with another vehicle, the vehicle control apparatus 800 may control the another vehicle through the communication unit 810. Here, controlling the another vehicle may include acquiring right to control the another vehicle. The controlling the another vehicle may include, for example, controlling a driving state (e.g., speed, traveling direction, steering angle, etc.) of the another vehicle.

In some implementations, the vehicle control apparatus 800 may include the sensing unit 820. The sensing unit 820 may be the object detecting apparatus 300 described with reference to FIG. 7 or the sensing unit 120 provided in the vehicle 100. For example, the sensing unit 820 may also be implemented in combination of at least two of the camera 310, the radar 320, the LiDAR 330, the ultrasonic sensor 340 and the infrared sensor 350 provided in the object detecting apparatus 300, and the sensing unit 120.

The sensing unit 820 may sense information related to the vehicle 100. The information related to the vehicle may include at least one of vehicle information (or a driving status of the vehicle) and the surrounding information related to the vehicle.

For example, the vehicle information may include a driving speed of the vehicle, a weight of the vehicle, a number of passengers in the vehicle, a braking force of the vehicle, a maximum braking force of the vehicle, a driving mode of the vehicle (autonomous driving mode or manual driving mode), a parking mode of the vehicle (autonomous parting mode, automatic parking mode, manual parking mode), whether or not a user is present in the vehicle, information associated with the user (e.g., whether or not the user is an authenticated user), and the like.

The surrounding information of the vehicle, for example, may be a state of a road surface on which the vehicle is traveling (e.g., a frictional force), the weather, a distance from a front-side (or a rear-side) vehicle, a relative speed of a front-side (or a rear-side) vehicle, a curvature of a curve when a driving lane is the curve, ambient brightness of the vehicle, information associated with an object existing in a reference region (predetermined region) based on the vehicle, whether or not an object enters (or leaves) the predetermined region, whether or not the user exists near the vehicle, information associated with the user (e.g., whether or not the user is an authenticated user), and the like.

The surrounding information (or surrounding environment information) of the vehicle may include external information related to the vehicle (e.g., ambient brightness, temperature, a position of the sun, information related to nearby subject (a person, another vehicle, a sign, etc.), a type of a driving road surface, a landmark, line information, and driving lane information), and information required for an autonomous driving/autonomous parking/automatic parking/manual parking mode.

In addition or alternatively, the surrounding information may include a distance from an object existing near the vehicle to the vehicle 100, a type of the object, a parking space for the vehicle, an object to identify the parking space (e.g., a parking line, a string, another vehicle, a wall, etc.), and the like.

In addition or alternatively, the surrounding information of the vehicle may include a distance between a communicatively connected external device (e.g., RSU or another vehicle) and the vehicle 100, a relative speed between the external device and the vehicle 100, a speed of the vehicle 100, a speed of another vehicle, etc.

The information related to the vehicle that is sensed through the sensing unit 820 may be used in an autonomous driving mode for autonomous driving of the vehicle. For example, the processor 870 may control the vehicle to travel in an autonomous driving mode, by using information related to the vehicle sensed through the sensing unit 820.

In some implementations, the vehicle control apparatus 800 may include the display 830. The display 830 that is included in the vehicle control apparatus 800, which is a display device provided in the vehicle 100, may be the display 251 described above.

The display 830 may be the output unit 250 or the display 251 illustrated in FIG. 7. In some implementations, the display 830 may include an output unit (e.g., a touch screen) of a mobile terminal capable of performing communication with the communication device 400. In addition or alternatively, the display 830 may include a transparent display. The transparent display may be attached to the windshield or the window.

The display 830 may be disposed on or around a steering wheel, instrument panels 251a, 251b, 251e, a seat 251d, each pillar 251f, a door 251g, a center console, a headlining and/or a sun visor, and/or implemented on or around a windshield 251c or a window 251h. For example, the display 830 may include a cluster, a center information display (CID), a navigation device, a head-up display (HUD), and the like.

The display 830 may have an inter-layered structure or an integrated structure with a touch sensor in order to implement a touch screen. The touch screen may function as the user input unit 210 which provides an input interface between the vehicle 100 (or the vehicle control apparatus 800) and the user and simultaneously provide an output interface between the vehicle 100 (or the vehicle control apparatus 800) and the user.

The processor 870 may output various information related to the vehicle to the display 830. In addition, the processor 870 may output the information related to the vehicle to a different position of the display 830 according to a type of information related to the vehicle. Various information output to the display 830 will be described later in detail with reference to the accompanying drawings.

The display 830 may be the navigation system 770 (or a navigation device). Alternatively, the display 830 may include or implemented by the navigation system 770. That is, the display 830 may refer to a navigation device provided in the vehicle 100. The navigation device may be built in the vehicle 100 from shipment of the vehicle 100 or a navigation device mounted by a user. Alternatively or in addition, the display 830 may refer to a navigator for a vehicle, and may be a navigation system independent of the navigation system provided by the mobile terminal 900. The description of the display 830 herein may be applied to the navigation system 770, a navigation device, or a navigator for vehicle in the same or similar manner.

In some implementations, the vehicle control apparatus 800 may include a memory. The memory may be the memory 140 that is described in FIG. 7.

Various information may be stored (recorded) in the memory. For example, information related to the vehicle sensed through the sensing unit 820 may be stored in the memory 140. The memory may be configured to store, change or delete information under the control of the processor 870.

In some implementations, information related to communication reliability may be stored in the memory. For example, the information related to the communication reliability may pre-include communication reliability by the speed of the vehicle, by the relative speed between the vehicle and the communicatively connected external device or by the distance (communication distance) between the vehicle and the external device.

In some implementations, the vehicle control apparatus 800 may include the processor 870 to control the communication unit 810, the sensing unit 820, the display 830, the memory (not illustrated), and the like.

The processor 870 may include, be included in, or implemented by, the controller 170 described in FIG. 7. The processor 870 may control the components described in FIG. 7 and the components described in FIG. 8.

In some implementations, the processor 870 may be connected to communicate with an external device through the communication unit 810. In addition, the processor 870 may control the display 830 to activate a graphic object of content executable at the communication reliability based on the communication reliability with the external device.

Hereinafter, with reference to the accompanying drawings, an example optimized method for autonomously driving a vehicle will be described in more detail.

Figure 9:
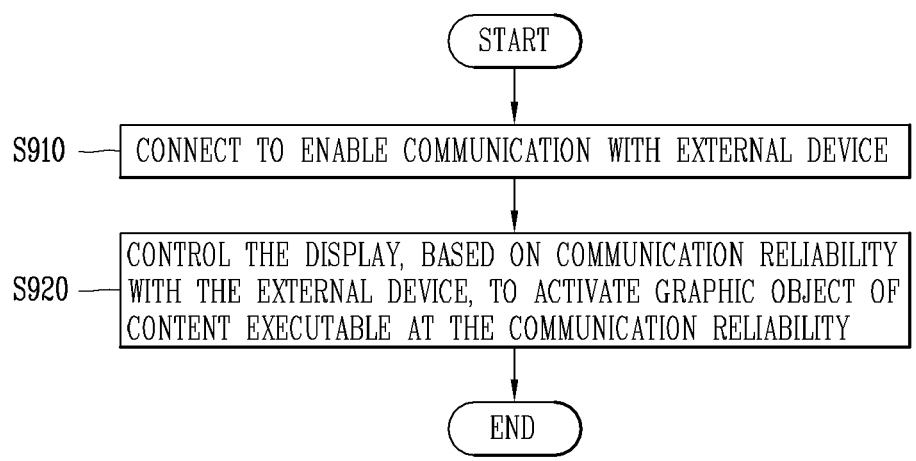
FIG. 9 is a flowchart of an example vehicle control method.

FIG. 9 is a flowchart of an example control method according to implementations of the present disclosure, and FIGS. 10 to 17 illustrate various implementations of the control method of FIG. 9.

Referring to FIG. 9, the method includes connecting to an external device to enable communication [S910].

In some implementations, the processor 870 may control the communication unit 810 to be communicatively connected to an external device that is capable of performing communication. In one example, the processor 870 may connect the external device to the communication unit 810 to perform communication, based on a preset condition being satisfied.

The preset condition may include, for example, a condition that a user input of requesting a communication connection with an external device (or a user request) is received, a condition that a signal transmitted from an external device is received through the communication unit 810, a condition that a vehicle enters a predetermined distance from an external device that is previously communicatively connected, or a condition that a vehicle enters a communication distance (or a communication area) capable of performing communication with an external device.

Here, the external device may include various types of communication apparatuses that can communicate while being located outside the vehicle, for example, a road side unit (RSU) installed near a road, a server, the Internet, a cloud server, or another vehicle.

The external device may serve as a content provider for providing content (e.g., one or more content items). For example, the external device may transmit (provide) the content so that the content is executed in the vehicle control apparatus 800 (or the vehicle 100).

The processor 870 of the vehicle control apparatus 800 may receive content from an external device, and execute (or output) the received content through the display 830 (or the output unit described herein).

Referring still to FIG. 9, the method may include controlling the display 830, based on communication reliability with an external device, to activate a graphic object of content that is executable at the communication reliability [S920].

The communication reliability may be defined as a predetermined criterion for a reliability performance of a system in mobile communication, etc. In some implementations, the communication reliability may be determined according to how much proportional time is received within a given time in a predetermined region.

For example, communication reliability may be a value that represents that, when transmitting and receiving content (or information, data, etc.) through communication between two devices, how seamlessly the content can be transmitted or received, by what rate the content is transmitted within a given time period, or the like.

Such communication reliability may serve as a criterion or element even when performing a communication between a vehicle control apparatus (or a vehicle) and an external device.

For example, when communication reliability is equal to or less than a predetermined value, the number of times of interruption increases as content is transmitted from an external device to a vehicle control apparatus, or the quality of content being transmitted is inevitably lowered to reduce the number of times of interruption.

Such communication reliability may be determined by various factors. For example, communication reliability between a vehicle control apparatus (or a vehicle) and an external device may be determined by a performance of communication between a communication unit of the vehicle control apparatus and the external device, and an environment (e.g., temperature, humidity, foreign matter concentration, etc.) between the vehicle and the external device.

In addition or alternatively, the communication reliability may be determined based on a speed of the vehicle, a relative speed between the vehicle and the external device, or a distance between the vehicle and the external device.

Figure 10:
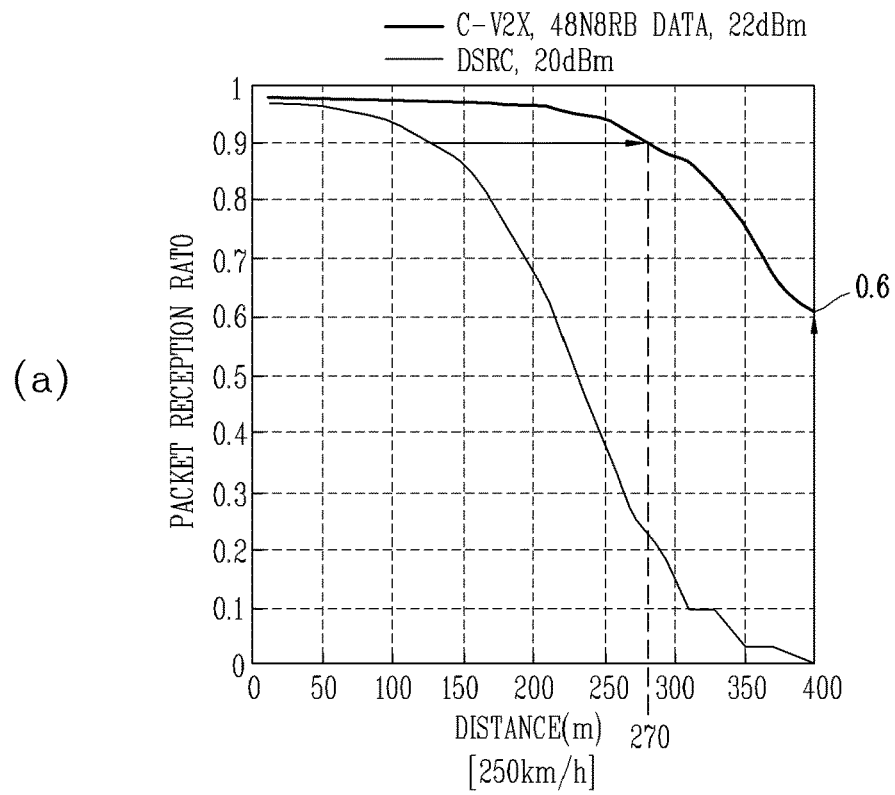
FIG. 10 shows graphs of example communication reliability to illustrate the control method of FIG. 9.
Figure 10:
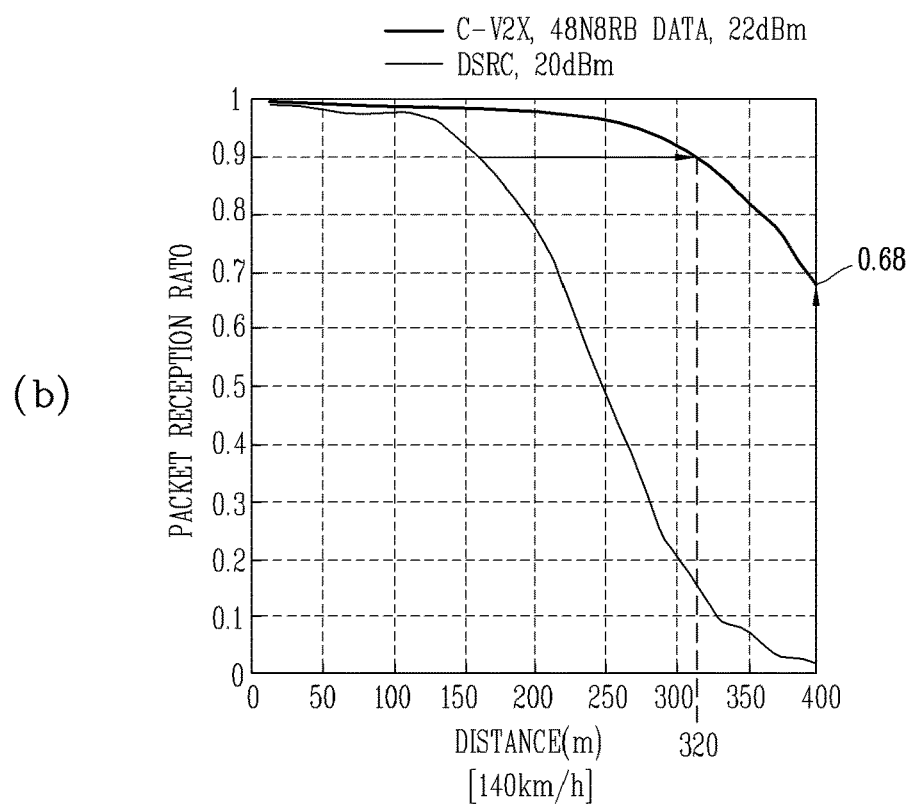

For example, referring to FIG. 10, graph (a) shows a communication reliability (vertical axis) when a vehicle speed (or a relative speed between a vehicle and an external device) is 250 km/h and a communication distance (horizontal axis) between the vehicle and the external device. Graph (b) shows a communication reliability (vertical axis) when a vehicle speed (or a relative speed between a vehicle and an external device) is 140 km/h and a communication distance (horizontal axis) between the vehicle and the external device. Graphs (a) and (b) of FIG. 10 may be created based on data measuring communication reliability.

First, referring to graph (a) of FIG. 10, when a vehicle speed (or a relative speed between a vehicle and an external device) is 250 km/h, a communication distance between the vehicle having a communication reliability of 0.9 (90%) and the external device may be 270 m. That is, at 250 km/h, when the communication distance between the vehicle and the external device is within 270 m, the communication reliability may be 0.9 or more.

Also, referring to graph (b) of FIG. 10, when a vehicle speed (or a relative speed between a vehicle and an external device) is 140 km/h, a communication distance between the vehicle having a communication reliability of 0.9 (90%) and the external device may be 320 m. That is, at 140 km/h, when the communication distance between the vehicle and the external device is within 320 m, the communication reliability may be 0.9 or more.

In addition, referring to graphs (a) and (b) of FIG. 10, where the communication distances between the vehicle and the external device are both 400 m, the communication reliability is 0.6 when the vehicle speed (or the relative speed between the vehicle and the external device) is at 250 km/h and is 0.68 when the vehicle speed is 140 km/h.

That is, it can be seen that the communication reliability between the external device and the communication unit 810 is inversely proportional to the relative speed between the external device and the vehicle. That is, the faster the relative speed is, the lower the communication reliability becomes, at a same communication distance. In addition, the communication reliability between the external device and the communication unit 810 may decrease as the relative speed between the external vehicle and the vehicle increases (or becomes greater or faster), and may increase as the relative speed decreases (or becomes slower).

In addition, referring to graphs (a) and (b) of FIG. 10 each, the communication reliability between the external device and the communication unit 810 (or the vehicle) increases as a distance between the external device and the vehicle becomes shorter. That is, the communication reliability between the external device and the communication unit 810 may be inversely proportional to the distance between the external device and the vehicle. For example, the communication reliability between the external device and the communication unit 810 may increase as the distance between the external device and the vehicle becomes shorter, and may decrease as the distance becomes greater.

In addition, it can be seen that a size of a communication area (or communication distance) that has communication reliability of a predetermined value (e.g., 0.9 or 90%) or more is inversely proportional to the relative speed between the external device and the vehicle. That is, the communication distance that provides communication reliability of 0.9 is 270 m in graph (a) of FIG. 10 in which the relative speed is 250 km/h, while the communication distance that provides communication reliability of 0.9 is 320 m in graph (b) of FIG. 10 in which the relative speed is 140 km/h. That is, the slower the relative speed is, the larger the size of a communication area (communication distance between the vehicle and the external device) that has communication reliability of a predetermined value or higher becomes. For example, the size of the communication area having the communication reliability of the predetermined value or higher may become smaller as the relative speed between the external device and the vehicle increases, and become larger as the relative speed decreases.

To sum up, the communication reliability between the external device and the communication unit may be inversely proportional to the relative speed and to the distance between the external device and the vehicle. Further, the size of the communication area having the communication reliability of the predetermined value or higher may be inversely proportional to the relative speed between the external device and the vehicle.

For example, the communication reliability between the external device and the communication unit may decrease as the relative speed between the external device and the vehicle increases, and may decrease as the distance between the external device and the vehicle increases. Further, the size of the communication area that has communication reliability of a predetermined value or higher may become smaller as the relative speed between the external device and the vehicle increases.

Figure 11:
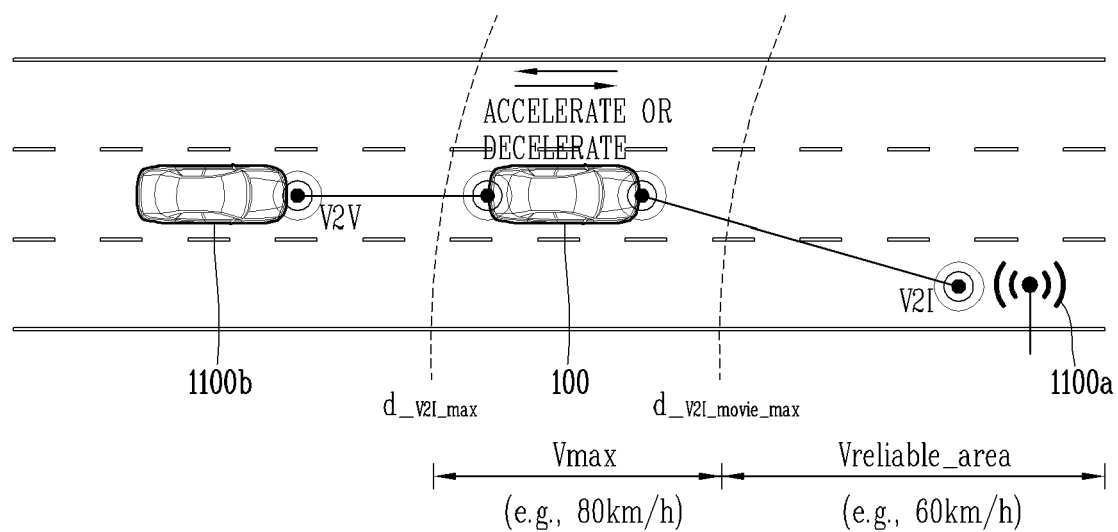
FIG. 11 illustrates example external devices.

Referring to FIG. 11, the external device may include a road side unit (RSU) 1100*a* installed near (or inserted into) a road, another vehicle 1100*b*, etc. The RSU or another vehicle may exist within a distance capable of performing communication with the vehicle 100.

In some implementations, content (e.g., one or more content items) provided by the external device (or received by the vehicle control apparatus) may be content received from the external device through the communication unit 810 and executed by the display 830 (or the output unit).

The content may include all types of content executable in an external device or a vehicle control apparatus (or a vehicle). For example, the content may include location information, map information, weather information, route information, navigation information, music, video, voice/video call, various applications, and the like.

In the content, communication reliability required for execution of the content may be preset. For example, communication reliability may be differently associated with each type of content. For example, a first type of content may be associated with a first communication reliability, and a second type of content different from the first type may be associated with a second communication reliability different from the first communication reliability.

The processor 870 may determine a type of content that is or will be executed in the display 830 of the vehicle through the communication unit 810, based on communication reliability. In some implementations, communication between the communication unit 810 and the external device may be included in vehicle to everything (V2X) communication.

For example, when receiving content through the communication unit 810, the processor 870 may determine content that is executable on the display based on communication reliability associated with the content to be received, and based on current communication reliability between the communication unit 810 and the external device.

In addition or alternatively, as illustrated in FIG. 11, when attempting to execute content in the vehicle through V2X communication between the vehicle 100 and the external device (e.g., the RSU 1100a or another vehicle 1100b), the processor 870 may decelerate/accelerate a speed of the vehicle or adjust a communication distance between the vehicle and the external device (e.g., 1100a or 1100b) so that the current communication reliability fulfills (or secures or satisfies) the communication reliability associated with the content (or the communication reliability of the content) that is attempted to be executed.

Hereinafter, a vehicle control apparatus of the present disclosure that is capable of receiving content from an external device based on communication reliability and executing the content received in a vehicle in an optimized manner will be described in more detail with reference to the accompanying drawings.

Figure 12:
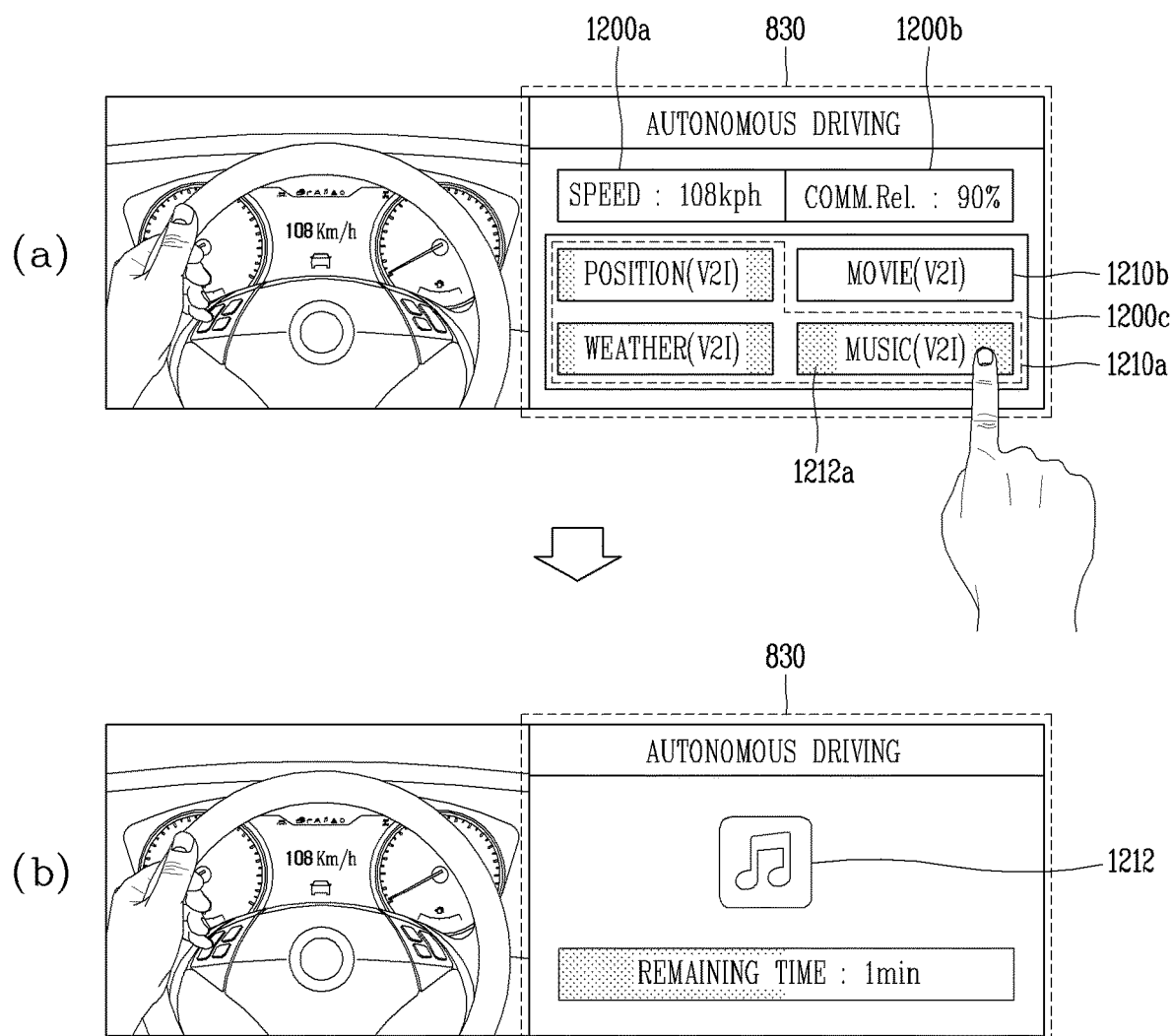
FIG. 12 illustrates an example display of a graphic object.

Referring to FIG. 12, when connected to communicate with an external device, the display 830 of the present disclosure may display a graphic object 1200c of content that can be received from the external device.

In some implementations, an example of the graphic object of the content may include an icon (or an image, a thumbnail, etc.) of the corresponding content. In addition, when connected to communicate with the external device, the display 830 may further display information 1200a indicating a current vehicle speed (or a relative speed between the communicatively connected external device and the vehicle) and information 1200b indicating communication reliability between the communicatively connected external device and the vehicle (e.g., the communication unit 810 thereof).

When the processor 870 is connected to communicate with an external device, the processor 870 may receive information related to content that can be provided (or transmitted) from the external device through the communication unit 810. The information related to the content may include various pieces of information related to the content, such as a type of the content, a size of the content, and communication reliability associated with the content.

The processor 870 may display a graphic object 1200c of content that can be received from the external device based on the information related to the content.

The processor 870 may control the display 830, based on communication reliability with an external device, to activate a graphic object of content that is executable at the communication reliability.

In some implementations, activating a graphic object of executable content may mean activating a touch of the graphic object so that the corresponding content is executed and/or displaying the graphic object of the executable content differently from an inactivated graphic object. For example, when a touch is applied to an activated first graphic object, the processor 870 may execute content of the touched first graphic object, and when a touch is applied to a deactivated second graphic object, the processor 870 does not execute content of the second graphic object.

As described above, communication reliability between a vehicle (e.g., the communication unit 810 thereof) and an external device may be determined based on at least one of a current vehicle speed and a distance (communication distance) between the vehicle and the external device.

The processor 870, based on at least one of a current vehicle speed and a distance between the vehicle and the external device, may determine current communication reliability between the external device and the communication unit.

In addition, the processor 870, based on information related to a plurality of contents (e.g., a plurality of content items) that are received from the external device and further on the current communication reliability, may determine a type of contents that is executable at the current communication reliability among graphic objects of the plurality of contents.

For example, as illustrated in diagram (a) of FIG. 12, graphic objects 1200c of the plurality of contents may be displayed on the display 830 based on the information related to the plurality of contents received from the external device.

The processor 870 may activate a graphic object 1210a of a first content (e.g., a first content item) that is executable at the current communication reliability among the plurality of contents so that execution of the first content is allowed. In addition, the processor 870 may deactivate a graphic object 1210b of a second content that is not executable at the current communication reliability among the plurality of contents so that execution of the second content is restricted.

Accordingly, the graphic object 1210a of the first content and the graphic object 1210b of the second content may be displayed on the display 830 in a manner of being visually distinguished from each other. That is, the processor 870 may display the graphic object 1210a of the first content and the graphic object 1210b of the second content on the display 830 in different ways.

The first content that is executable at the current communication reliability may have communication reliability that is lower than the current communication reliability. That is, when the current communication reliability is higher than the communication reliability associated with the first content, the processor 870 may determine the first content as executable at the current communication reliability.

The second content that is not executable at the current communication reliability may have communication reliability that is higher than the current communication reliability. That is, when the current communication reliability is lower than the communication reliability associated with the second content, the processor 870 may determine the second content as not executable at the current communication reliability.

Each of the graphic objects 1200c of the content may include content information related to a type of the content, a title of the content, etc., or types of communication connection (e.g., V2V, V2I, V2P, etc.) between the external device and the communication unit 810.

As illustrated in diagram (a) of FIG. 12, when a touch is applied (or a selection is made) to any one of the graphic objects 1210a of the executable first content, the processor 870 may execute content 1212 of the touched graphic object 1212a as illustrated in diagram (b) of FIG. 12.

In some implementations, an execution screen of the content 1212 may be output to the display 830.

When a touch is applied to a graphic object (e.g., 1212a) of the executable first content, the processor 870 may receive and execute the first content 1212 from a communicatively connected external device in a streaming manner, or may download the first content from the external device.

Thereafter, the processor 870 may execute the first content received in a streaming manner on the display 830 in real time or may execute the downloaded first content on the display 830.

In some implementations, the receiving the first content in a streaming manner may be performed when the driving mode of the vehicle is the autonomous driving mode.

For example, the processor 870 may receive a request for execution of V2X communication-based content through the display 830 (or user interface apparatus 200). The processor 870 may scan a communicable external device based on the request, and connect the V2X communication to enable communication with the external device. Thereafter, the processor 870 may receive information related to the content from the external device that is communicatively connected through V2X communication.

The processor 870 may sense a speed of a currently traveling vehicle through the sensing unit 820, and determine communication reliability based on the speed of the vehicle.

In some implementations, the processor 870 may output only a type of executable content to the display 830 based on the information related to the content and the communication reliability.

Thereafter, when a graphic object of executable content is selected as illustrated in diagram (a) of FIG. 12, the processor 870 may receive the content from the external device for a predetermined time to execute the content without interruption.

Afterwards, the processor 870 may execute the content received during the predetermined time in a streaming manner, or execute the content after completing a download of the content. Information regarding the predetermined time may be output to the display 830 as illustrated in diagram (b) of FIG. 12.

In some implementations, the processes described above with reference to FIG. 12 may be performed, for example, when the driving mode of the vehicle is in the autonomous driving mode.

Figure 13:
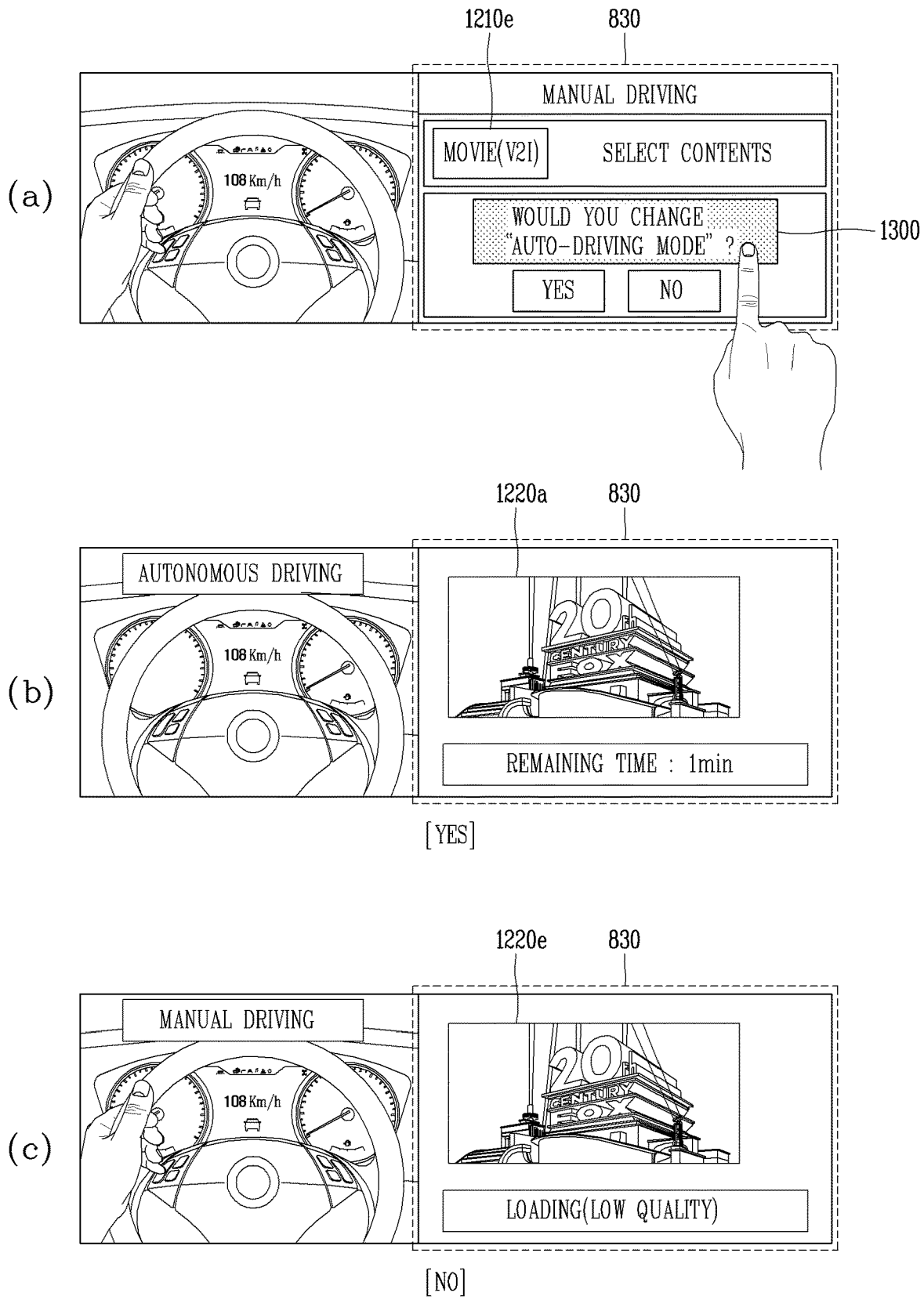
FIG. 13 illustrates an example control process when a graphic object is selected during a manual driving mode.

Referring to FIG. 13, in some implementations, when a touch is applied to a graphic object 1210e of the first content while a driving mode of a vehicle is in a manual driving mode, the processor 870 may receive the first content from the external device so as to have different qualities based on the driving mode of the vehicle.

For example, while a driving mode of a vehicle is in a manual driving mode, the processor 870 may receive a request for execution of V2X communication-based content through the display 830 (or user interface apparatus 200).

The processor 870 may scan a communicable external device based on the request, and connect the V2X communication to enable communication with the external device. Thereafter, the processor 870 may receive information related to the content from an external device that is communicatively connected through V2X communication.

The processor 870 may sense a speed of a currently traveling vehicle through the sensing unit 820, and determine communication reliability based on the speed of the vehicle.

In some implementations, the processor 870 may output only a type of executable content to the display 830 based on the information related to the content and the communication reliability.

Thereafter, as illustrated in diagram (a) of FIG. 13, the processor 870, based on a touch applied to the graphic object 1210e of the first content while the driving mode of the vehicle is in the manual driving mode, may output screen information 1300 inquiring whether to switch the driving mode of the vehicle to an autonomous driving mode on the display 830.

Thereafter, as illustrated in diagram (b) of FIG. 13, when the driving mode of the vehicle is switched to the autonomous driving mode through the screen information 1300, the processor 870 may receive (and execute) the first content 1220 from the external device so that the first content 1220 has a first quality.

In other implementations, as illustrated in diagram (c) of FIG. 13, when the driving mode of the vehicle is maintained in the manual driving mode through the screen information 1300, the processor 870 may receive (and execute) the first content from the external device so that the first content has a second quality that is lower than the first quality. Here, since the first quality is higher than the second quality, the first content having the first quality may have a better image quality than the first content having the second quality.

As described above, the present disclosure may provide a vehicle control apparatus capable of determining a type of content that is received from an external device and executable in the vehicle based on current communication reliability (or current vehicle speed), and providing the same in an optimized manner.

Referring now to FIGS. 14-17, when an execution of any one of content to be received through an external device is requested, the vehicle control apparatus of the present disclosure may control a driving state of a vehicle based on communication reliability associated with the content requested to be executed, and communication reliability between the current vehicle and the external device.

For example, the processor 870 may control the driving state of the vehicle such that the second communication reliability between the current vehicle and the external device is higher than the first communication reliability associated with the content requested to be executed.

Figure 14:
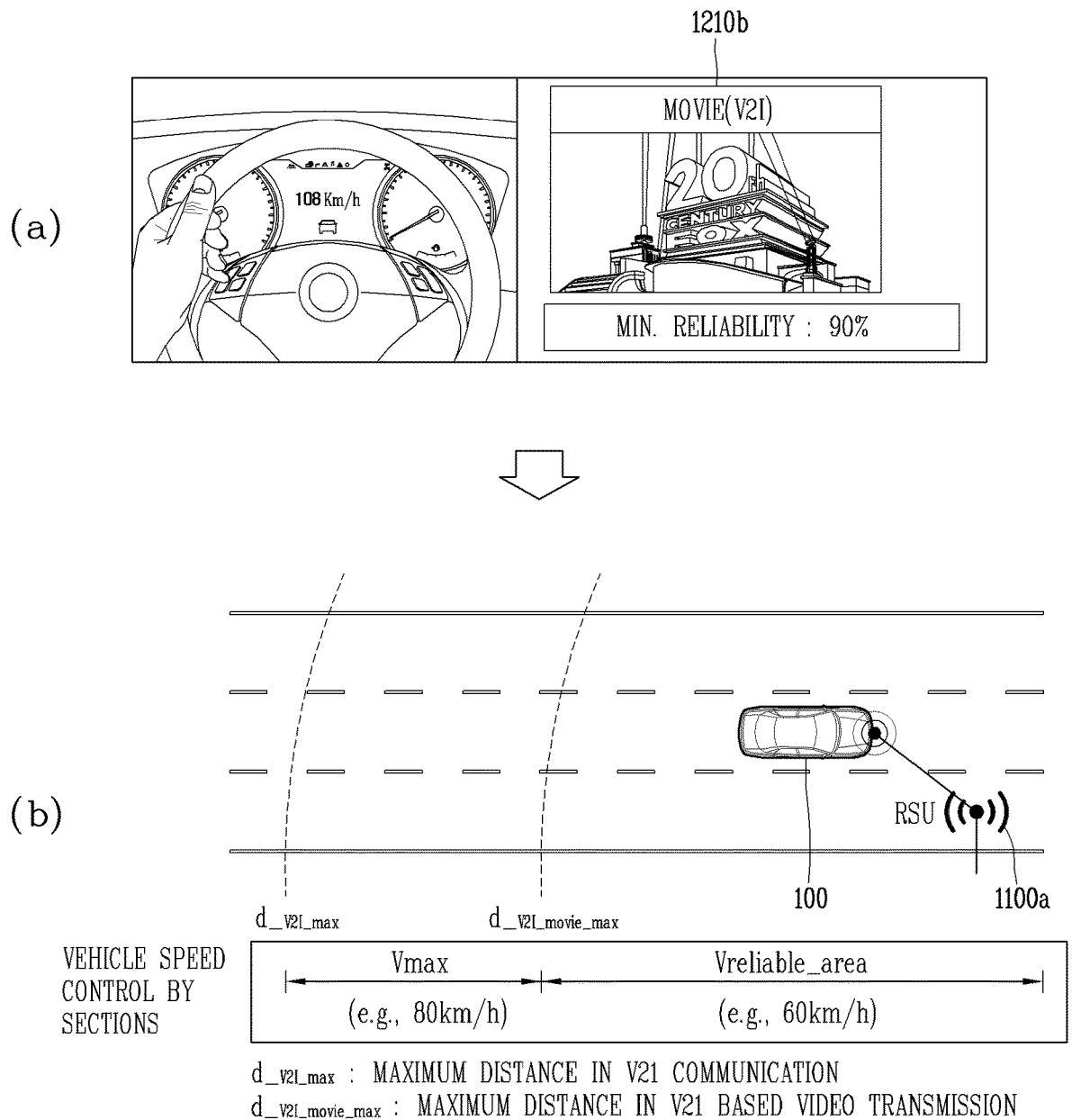
FIG. 14 illustrates an example control process for controlling a driving state of a vehicle based on communication reliability.

Referring to diagram (a) of FIG. 14, the display 830 may display a graphic object of at least one content. When a touch is applied to a graphic object of any one of the content in the at least one of the plurality of contents, the processor 870 may control a vehicle speed based on a first communication reliability required for executing the any one of the plurality of contents (i.e., first communication reliability associated with the any one of the content) and a second communication reliability with a current external device (i.e., second communication reliability between the current vehicle (e.g., the communication unit 810 thereof) and the external device 1100a).

The second communication reliability may be determined based on a communication distance between the external device 1100a and the vehicle 100 (or the communication unit 810).

When the second communication reliability is lower than a first communication reliability (communication reliability required for execution of content), the processor 870 may increases a speed of the vehicle 100 so that the vehicle 100 enters a communication distance d_V2I_movie_max having the first communication reliability from the external device.

The second communication reliability increases as the distance between the vehicle 100 and the external device 1100a is shorter. For example, when the second communication reliability (current communication reliability with the external device) is lower than the first communication reliability (communication reliability required for the execution of the content), it may mean the distance between the vehicle and the external device 1100a is farther than a communication distance d_V2I_movie_max for securing the first communication reliability.

Also, since the vehicle needs to receive information related to the content from the external device, the vehicle may have a spaced distance shorter than the communication distance d_V2I max in which a communication with the external device 1100a is available.

The communication distance d_V2I_movie_max for securing the first communication reliability may be shorter than the communication distance d_V2I max in which a communication with the external device 1100a is available as illustrated in diagram (b) of FIG. 14.

As illustrated in diagram (b) of FIG. 14, when a vehicle exists between the communication distance d_V2I max in which a communication is available and the communication distance d_V2I_movie_max for ensuring the first communication reliability, the processor 870 may increase the speed of the vehicle so that the distance between the vehicle and the external device 1100a is shorter than the distance d_V2_I_movie_max for securing the first communication reliability (e.g., so that the vehicle rapidly enters an area for securing the first communication reliability).

When the vehicle 100 enters the communication distance d_V2_I_movie_max for securing the first communication reliability, the second communication reliability (i.e., communication reliability with the current external device) becomes higher than the first communication reliability.

Thereafter, when the vehicle 100 enters the communication distance d_V2_I_movie_max that provides the first communication reliability from the external device 1100a, the processor 870 may maintain the speed of the vehicle so that the second communication reliability does not become lower than the first communication reliability (or so that the second communication reliability is maintained higher than the first communication reliability).

In implementations where the external device is another vehicle 1100b, the processor 870, when receiving and executing any one content from the another vehicle, may control at least one between the speed of the vehicle 100 and the speed of the another vehicle 1100b, based on the first communication reliability associated with the any one content and the current second communication reliability with the another vehicle.

Figure 15:
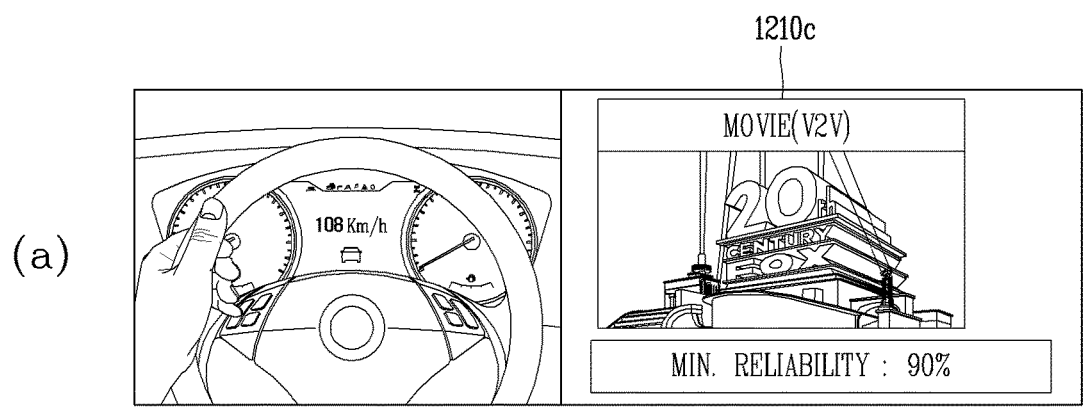
FIG. 15 illustrates an example control process for controlling a driving state of vehicles based on communication reliability.
Figure 15:
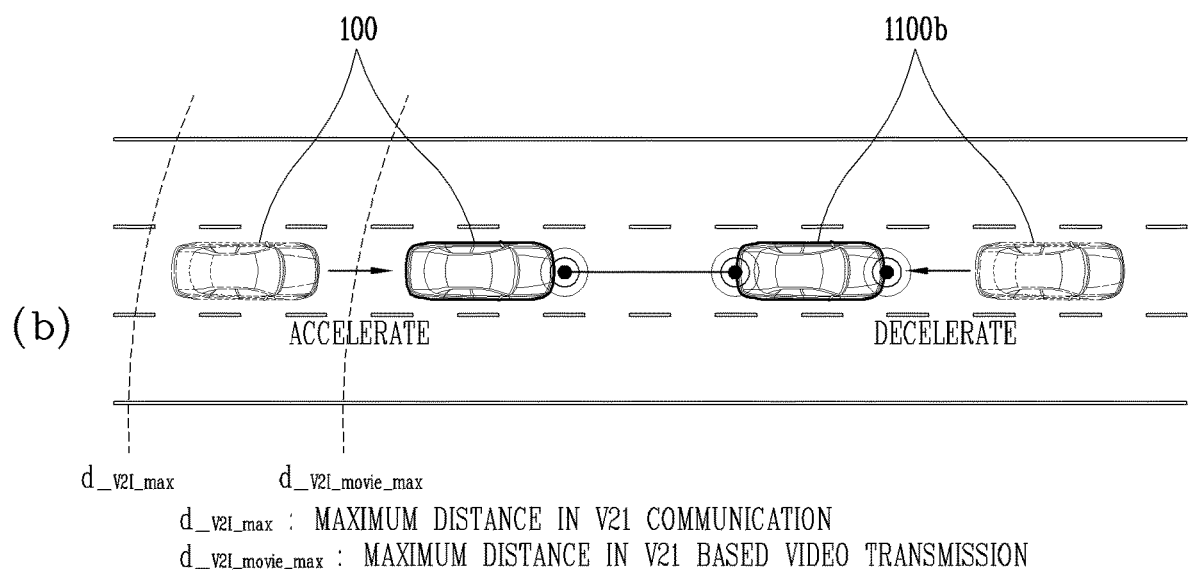

For example, as illustrated in diagram (a) of FIG. 15, the processor 870 may be communicatively connected to perform V2V communication with another vehicle 1100b through the communication unit 810.

Subsequently, when execution of any one content 1210c is requested, the processor 870 may control the speed of the vehicle based on a current second communication reliability with the another vehicle 1100b and a first communication reliability associated with the any one content 1210c.

For example, when the second communication reliability is lower than the first communication reliability, the processor 870 may increase or decrease the speed of the vehicle so that a distance between the vehicle and the another vehicle is shorter than a communication distance d_V2V_movie_max that provides the first communication reliability.

For example, when the vehicle 100 is behind the another vehicle 1100b, the processor 870 may increase the speed of the vehicle so that the distance between the vehicle and the another vehicle is shorter than the communication distance d_V2V_movie_max that provides the first communication reliability, as illustrated in diagram (b) of FIG. 15.

As another example, when the vehicle 100 is in front of the another vehicle 1100b, the processor 870 may decrease the speed of the vehicle so that the distance between the vehicle and the another vehicle is shorter than the communication distance d_V2V_movie_max that provides the first communication reliability.

Accordingly, implementations of the present disclosure may provide new vehicle control methods for controlling a vehicle speed so as to quickly satisfy communication reliability required in executing content that is requested by a driver of the vehicle.

In some implementations, when a touch is applied to a graphic object of content while a driving mode of a vehicle is in a manual driving mode, the processor 870 may switch the driving mode of the vehicle to an autonomous driving mode while downloading the content from the external device. Thereafter, when the content is downloaded, the processor 870 may restore the driving mode of the vehicle from the autonomous driving mode to the manual driving mode.

Figure 16:
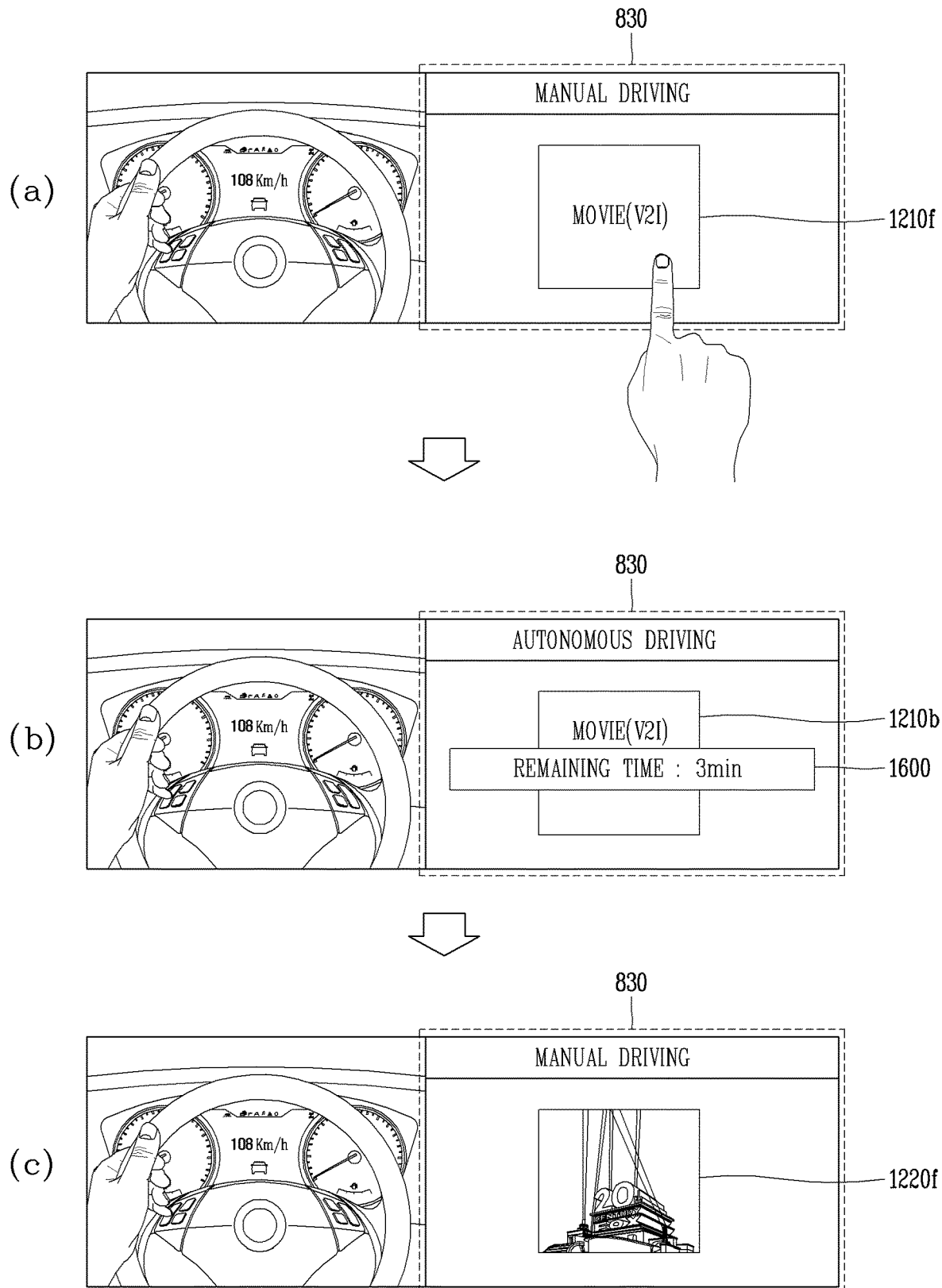
FIG. 16 illustrates an example control process for switching driving modes.

For example, as illustrated in diagram (a) of FIG. 16, the display 830 may display a graphic object 1210f of content executable through communication with an external device in the manual driving mode. In this state, when a touch is applied to the graphic object 1210f of content while the driving mode of the vehicle is in the manual driving mode, the processor 870 may switch the driving mode of the vehicle to an autonomous driving mode while downloading the content from the external device, as illustrated in diagram (b) of FIG. 16. Here, the display 830 may display information 1600 related to the download (e.g., remaining download time, progressed download time, downloaded percentage, etc.).

Thereafter, when the content is downloaded, the processor 870 may restore the driving mode of the vehicle from the autonomous driving mode to the manual driving mode, as illustrated in diagram (c) of FIG. 16. In addition, the processor 870 may execute (output) the downloaded content 1220f through the display 830 in the manual driving mode.

In some implementations, as described in FIG. 15, an external device may be another vehicle 1100b. When the processor 870 is connected with the another vehicle 1100b in V2V communication, the processor 870 may display on the display 830 a graphic object of at least one content that can be received from the another vehicle 1100b and executed.

When any one of the graphic objects of the content displayed on the display 830 is selected, the processor 870 may adjust a distance between the vehicle and the another vehicle 1100b so as to secure communication reliability associated with the content of the selected graphic object. In order to adjust the distance between the vehicle and the another vehicle 1100b, the processor 870 may control a driving state of the vehicle (e.g., speed of the vehicle, etc.).

In some implementations, when execution of any one content is requested through the display 830, the processor 870 may control the speed of the vehicle based on a current second communication reliability with the another vehicle 1100b and a first communication reliability associated with the any one content.

For example, when the second communication reliability is lower than the first communication reliability, the processor 870 may increase or decrease the speed of the vehicle so that a distance between the vehicle and the another vehicle is shorter than a communication distance d_V2V_movie_max that provides the first communication reliability.

By way of example, when the vehicle 100 is behind the another vehicle 1100b, the processor 870 may increase the speed of the vehicle so that the distance between the vehicle and the another vehicle is shorter than the communication distance d_V2V_movie_max having the first communication reliability, as illustrated in diagram (b) of FIG. 15.

As another example, when the vehicle 100 is in front of the another vehicle 1100b, the processor 870 may decrease the speed of the vehicle so that the distance between the vehicle and the another vehicle is shorter than the communication distance d_V2V_movie_max having the first communication reliability.

Figure 17:
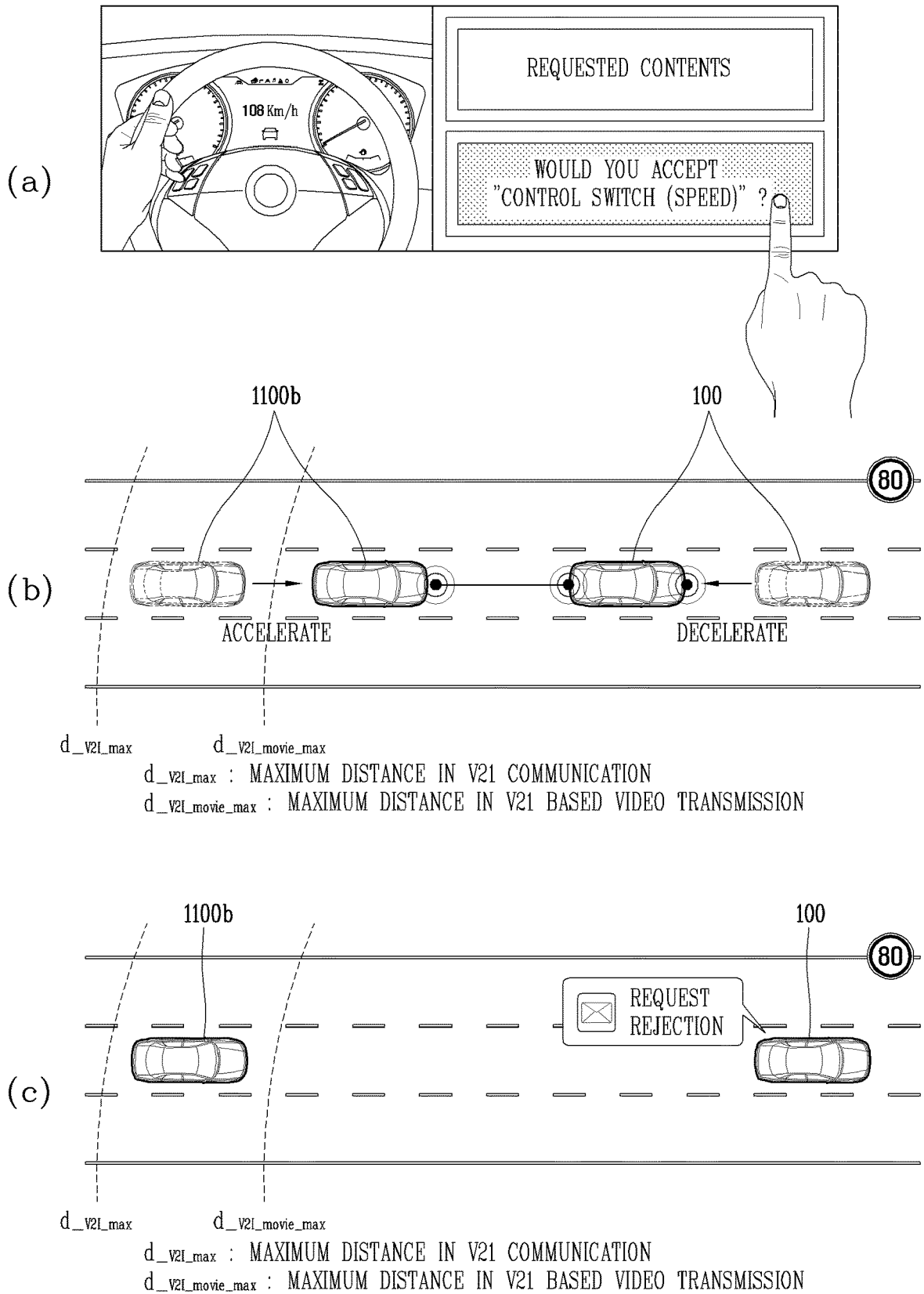
FIG. 17 illustrates an example control process for controlling a vehicle speed.

Referring to FIG. 17, in some implementations, the vehicle 100 may serve as a content provider that can provide content to another vehicle. In this case, the external device may be another vehicle 1100b.

When a request signal that demands content transmission from the external device is received by the communication unit, the processor 870 may output screen information corresponding to the request signal on the display 830, as illustrated in diagram (a) of FIG. 17.

Thereafter, the processor 870 may control a vehicle speed based on a reception of a user input for accepting the request signal through the screen information.

In some implementations, the processor 870 may determine a distance between the vehicle 100 and the another vehicle 1100b, based on a first communication reliability associated with content desired to be provided by the another vehicle and a second communication reliability with the current another vehicle.

For example, as illustrated in diagram (b) of FIG. 17, when the first communication reliability is higher than the second communication reliability (i.e., when the current second communication reliability is lower than the first communication reliability associated with the content), the processor 870 may control the distance between the vehicle 100 and the another vehicle 1100b to be shorter than the communication distance d_V2V_movie_max having the first communication reliability. That is, the processor 870 may control the distance between the vehicle 100 and the another vehicle 1100b so that the communication reliability between the vehicle 100 and the another vehicle 1100b (the second communication reliability) is higher than the communication reliability associated with the requested content (the first communication reliability).

The processor 870 may control a driving state (e.g., speed) of the vehicle or control a driving state (e.g., speed) of another vehicle to adjust a distance between the vehicle and the another vehicle.

For example, as illustrated in diagram (b) of FIG. 17, when the vehicle 100 is in front of the another vehicle 1100b, the processor 870 may decrease the speed of the vehicle so that the distance between the vehicle and the another vehicle is shorter than the communication distance d_V2V_movie_max having the first communication reliability.

As another example, when the vehicle 100 is behind the another vehicle 1100b, the processor 870 may increase the speed of the vehicle so that the distance between the vehicle and the another vehicle is shorter than the communication distance d_V2V_movie_max having the first communication reliability.

In some implementations, the processor 870 may control a driving state of the another vehicle 1100b (e.g., a driving speed of the another vehicle) through the communication unit 810 so that the second communication reliability is higher than the first communication reliability (or that the distance between the vehicles is shorter than the communication distance d_V2V_movie_max).

When the first communication reliability is higher than the second communication reliability (i.e., when the current second communication reliability is lower than the first communication reliability associated with the content), the processor 870 may transmit through the communication unit 810 a control signal capable of controlling a driving state of the another vehicle such that the distance between the vehicle 100 and the another vehicle 1100b is shorter than the communication distance d_V2V_movie_max having the first communication reliability.

For example, when the vehicle 100 is in front of the another vehicle 1100b, the processor 870 may transmit a control signal to increase the speed of the another vehicle through the communication unit 810 so that the second communication reliability is higher than the first communication reliability (or that the distance between the vehicles is shorter than the communication distance d_V2V_movie_max). In this case, the speed of the another vehicle may be increased.

As another example, when the vehicle 100 is behind the another vehicle 1100b, the processor 870 may transmit a control signal to decrease the speed of the another vehicle through the communication unit 810 so that the second communication reliability is higher than the first communication reliability (or that the distance between the vehicles is shorter than the communication distance d_V2V_movie_max). In this case, the speed of the another vehicle may be decreased.

When a distance between the vehicle 100 and the another vehicle 1100b is shorter than the communication distance d_V2V_movie_max (or when the current second communication reliability is higher than the first communication reliability associated with the content), the processor may control the speed of the vehicle 100 and/or the speed of the another vehicle 1100b so that the distance between the vehicle 100 and the another vehicle 1100b maintains at a current state (or so that the distance between the vehicles maintains shorter than the communication distance d_V2V_movie_max).

When the distance between the vehicle 100 and the another vehicle 1100b is shorter than the communication distance d_V2V_movie_max (or when the current second communication reliability is higher than the first communication reliability associated with the content), the processor 870 may transmit (or provide) the content requested by the another vehicle 1100b through the communication unit 810.

In other examples, when a request for content is rejected through the screen information displayed on the display 830, the processor 870 may transmit a message that rejects content provision to another vehicle 1100b through the communication unit 810, as illustrated in diagram (c) of FIG. 17.

Thereafter, the processor 870 may drive the vehicle in an existing manner.

According to implementations of the present disclosure, one or more of the following effects can be provided.

First, the present disclosure may provide a user interface that can receive and output content from an external device in an optimized manner by determining a type of content that can be provided in a vehicle according to current communication reliability.

Second, the present disclosure may provide a new method for controlling a vehicle to satisfy communication reliability in executing content that has been requested though a display.

Third, the present disclosure may provide a user with content through an external device in an optimized environment even while a vehicle is traveling, by determining a type of content that is executable according to communication reliability and/or varying a driving state of a vehicle based on communication reliability that is required to execute the content requested.

The advantages of the present disclosure are not limited to those mentioned above, and other advantages may be clearly understood by those skilled in the art from the description of the appended claims.

In some implementations, the vehicle control apparatus 800 described herein may be included in the vehicle 100.

The operations or control methods of the vehicle control apparatus 800 described herein may be applied to operations or control methods of the vehicle 100 (or the controller 170 thereof) in the same or similar manner. For example, a method for controlling the vehicle 100 (or the vehicle control apparatus 800) may include connecting to enable communication with an external device, and based on communication reliability with the external device, activating a graphic object of content executable at the communication reliability. Controlling the vehicle 100 (or the controller 170 thereof) may be implemented in the same or similar manner as the control methods of the vehicle control apparatus 800 as described herein.

In some implementations, one or more of the steps described with respect to the vehicle control apparatus 800 may be performed by the controller 170 provided in the vehicle 100.

Further, some or all of the functions, configurations, or control methods that can be performed by the vehicle control apparatus 800 described herein may be performed by the controller 170 provided in the vehicle 100. That is, some or all of the control methods described in this specification may be applied to a control method of a vehicle (e.g., the vehicle 100) or a control method of a control device (e.g., the controller 170).

Further, the vehicle control apparatus 800 described herein may be a mobile terminal. Further, some or all of the functions, configurations, or control methods that can be performed by the vehicle control apparatus 800 described herein may be performed by a controller that is provided in the mobile terminal. In addition, some or all of the control methods described herein can be applied to a method for controlling a mobile terminal in the same/like manner.

Some or all components of the present disclosure can be implemented as computer-readable codes in a program-recorded medium. The computer-readable medium may include various types of recording devices that each can store data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. A computer may include a processor or a controller.

What is claimed is:

1. A vehicle control apparatus comprising:
a communicator configured to enable communication with an external device;
a display; and
a processor configured to control the display to activate a graphic object representative of a content item that is executable based on communication reliability between the external device and the communicator,
wherein the vehicle control apparatus is included in a vehicle, and
wherein the processor is configured to,
based on (i) a user selection of the graphic object and (ii) the vehicle being in a manual driving mode, switch the manual driving mode to an autonomous driving mode and download the content item from the external device, and
based on the content item being downloaded, switch the autonomous driving mode to the manual driving mode.

2. The vehicle control apparatus of claim 1, wherein the vehicle control apparatus is included in a vehicle,
wherein the communication reliability between the external device and the communicator decreases based on a relative speed between the external device and the vehicle increasing, and increases based on a distance between the external device and the vehicle decreasing, and
wherein a communication area that has the communication reliability becomes smaller based on the relative speed between the external device and the vehicle increasing.

3. The vehicle control apparatus of claim 1, wherein the processor is configured to:
receive the content item from the external device through the communicator; and
execute the content item on the display,
wherein the content item includes data indicative of communication reliability that is preset to execute the content item on the display.

4. The vehicle control apparatus of claim 1, wherein the vehicle control apparatus is included in a vehicle,
wherein the processor is configured to:
based on at least one of a current vehicle speed or a distance between the vehicle and the external device, determine current communication reliability between the external device and the communicator, and
based on the current communication reliability and information related to a plurality of content items that are received from the external device, determine at least one type of content items that is executable based on the current communication reliability.

5. The vehicle control apparatus of claim 4, wherein the processor is configured to:
based on the information related to the plurality of content items that are received from the external device, output, using the display, a plurality of graphic objects that represent the plurality of content items,
activate a first graphic object representative of a first content item to permit execution of the first content item, the first content being executable based on the current communication reliability among the plurality of content items, and
deactivate a second graphic object representative of a second content item to restrict execution of the second content item, the second content item being not executable based on the current communication reliability among the plurality of content items.

6. The vehicle control apparatus of claim 4, wherein the processor is configured to output, using the display, information that indicates at least one of the current vehicle speed or the current communication reliability.

7. The vehicle control apparatus of claim 5, wherein the processor is configured to, based on a user selection of the first graphic object,
stream the first content item from the external device and execute the first content item, or
download the first content item from the external device.

8. The vehicle control apparatus of claim 7, wherein streaming the first content item includes:
streaming the first content item from the external device based on the vehicle being in an autonomous driving mode.

9. The vehicle control apparatus of claim 5, wherein the processor is configured to, based on (i) a user selection of the first graphic object and (ii) the vehicle being in a manual driving mode, receive the first content item from the external device such that the first content item has different qualities based on driving modes of the vehicle.

10. The vehicle control apparatus of claim 9, wherein the processor is configured to, based on (i) a user selection of the first graphic object and (ii) the vehicle being in the manual driving mode, output, using the display, information inquiring whether to switch the manual driving mode to an autonomous driving mode.

11. The vehicle control apparatus of claim 10, wherein the processor is configured to,
based on a user selection of switching the manual driving mode to the autonomous driving mode, receive the first content item from the external device so that the first content has a first quality, and
based on the manual driving mode of the vehicle being maintained, receive the first content item from the external device so that the first content has a second quality that is lower than the first quality.

12. The vehicle control apparatus of claim 1, wherein the display is configured to display at least one graphic object that represents at least one content item, and
wherein the processor is configured to, based on a user selection of one of the at least one graphic object, control a vehicle speed based on (i) first communication reliability that is required for executing a content item that is represented by the selected one of the at least one graphic object and (ii) second communication reliability, the second communication reliability being a current communication reliability between the external device and the communicator.

13. The vehicle control apparatus of claim 12, wherein the processor is configured to:
determine the second communication reliability based on a communication distance between the external device and a vehicle that includes the vehicle control apparatus, and
based on the second communication reliability being lower than the first communication reliability, increase a speed of the vehicle to change the communication distance so that the second communication reliability reaches the first communication reliability.

14. The vehicle control apparatus of claim 13, wherein the processor is configured to, based on the second communication reliability reaching the first communication reliability, maintain the speed of the vehicle so that the second communication reliability is not lower than the first communication reliability.

15. The vehicle control apparatus of claim 1, wherein the vehicle control apparatus is included in a first vehicle, wherein the external device is a second vehicle, and
wherein the processor is configured to, based on a user selection of one of a plurality of graphic objects outputted on the display, adjust a distance between the first vehicle and the second vehicle to secure communication reliability that is associated with a content item, wherein the selected one of the plurality of graphic objects represents the content item.

16. The vehicle control apparatus of claim 1, wherein the vehicle control apparatus is included in a first vehicle, wherein the external device is a second vehicle, and
wherein the processor is configured to:
receive, using the communicator, a request signal that includes a request for content transmission from the external device,
output, using the display, information that represents the request signal, and
control a vehicle speed based on a user input for accepting the request using the information.

17. The vehicle control apparatus of claim 16, wherein the processor is configured to adjust a distance between the first vehicle and the second vehicle such that communication reliability between the first vehicle and the second vehicle is higher than communication reliability that is associated with the content item requested by the request signal.

18. A vehicle comprising a vehicle control apparatus, the vehicle control apparatus comprising:
a communicator configured to enable communication with an external device;
a display; and
a processor configured to control the display to activate a graphic object representative of a content item that is executable based on communication reliability between the external device and the communicator,
wherein the processor is configured to,
based on (i) a user selection of the graphic object and (ii) the vehicle being in a manual driving mode, switch the manual driving mode to an autonomous driving mode and download the content item from the external device, and
based on the content item being downloaded, switch the autonomous driving mode to the manual driving mode.

19. A method for controlling a vehicle, the method comprising:
establishing communication with an external device; and
activating a graphic object representative of a content item that is executable based on communication reliability between the vehicle and the external device,
wherein the method further comprises:
based on (i) a user selection of the graphic object and (ii) the vehicle being in a manual driving mode, switching the manual driving mode to an autonomous driving mode and downloading the content item from the external device, and
based on the content item being downloaded, switching the autonomous driving mode to the manual driving mode.

* * * * *